United States Patent
Yang et al.

(10) Patent No.: US 10,162,769 B2
(45) Date of Patent: Dec. 25, 2018

(54) METHOD AND APPARATUS FOR TRANSMITTING AND RECEIVING DATA USING HDMI

(71) Applicant: LG ELECTRONICS INC., Seoul (KR)

(72) Inventors: Hyunsik Yang, Seoul (KR); Hyeonjae Lee, Seoul (KR); Jangwoong Park, Seoul (KR); Dokyun Kim, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/317,902

(22) PCT Filed: Jun. 12, 2015

(86) PCT No.: PCT/KR2015/005958
§ 371 (c)(1),
(2) Date: Dec. 9, 2016

(87) PCT Pub. No.: WO2015/190880
PCT Pub. Date: Dec. 17, 2015

(65) Prior Publication Data
US 2017/0116138 A1    Apr. 27, 2017

Related U.S. Application Data

(60) Provisional application No. 62/011,049, filed on Jun. 12, 2014.

(51) Int. Cl.
*G06F 13/10* (2006.01)
*G06F 13/42* (2006.01)
*H04L 29/08* (2006.01)

(52) U.S. Cl.
CPC ........ *G06F 13/102* (2013.01); *G06F 13/4282* (2013.01); *H04L 67/025* (2013.01)

(58) Field of Classification Search
CPC .......................... G06F 13/102; G06F 13/4282
(Continued)

(56) References Cited

U.S. PATENT DOCUMENTS 6,266,160 B1 * 7/2001 Saito ..................... H04L 51/066
358/1.15
6,448,958 B1 * 9/2002 Muta ..................... G06F 3/0481
345/169
(Continued)

FOREIGN PATENT DOCUMENTS

KR    10-2013-0126973 A    11/2013
KR        10-1364849 B1    2/2014

OTHER PUBLICATIONS

Steve Venuti, "Introducing HDMI 1.4 Specification Features", Press Release [Online], HDMI, 2009 [retrieved on Aug. 20, 2015], Retrieved from the Internet <Url: http://www.hdmi.org/download/press_kit/PressBriefing_HDMI1_4_Final_0831.9.pdf>.

*Primary Examiner* — Paul R. Myers
(74) *Attorney, Agent, or Firm* — Birch, Stewart, Kolasch & Birch, LLP

(57) ABSTRACT

A method and device for transmitting and receiving data using HDMI (High-Definition Multimedia Interface) are disclosed. The method, if performed by a source device, includes: receiving a request from a sink device to transmit data processing capability information indicating whether the source device is capable of processing user-input data or not; transmitting the data processing capability information to the sink device; and receiving the user-input data from the sink device.

16 Claims, 28 Drawing Sheets

(58) Field of Classification Search
USPC .......................................................... 710/73
See application file for complete search history.

(56) References Cited

U.S. PATENT DOCUMENTS

| | | | | |
|---|---|---|---|---|
| 9,779,463 | B2* | 10/2017 | Fine | ............... G06T 1/20 |
| 2001/0014602 | A1* | 8/2001 | Sato | ............... H04W 8/22 |
| | | | | 455/419 |
| 2002/0100061 | A1* | 7/2002 | Tsusaka | ........... G06F 21/10 |
| | | | | 725/135 |
| 2003/0018783 | A1* | 1/2003 | Bos | ............... G06F 9/5044 |
| | | | | 709/226 |
| 2008/0068649 | A1* | 3/2008 | Emori | ............. G06F 3/1204 |
| | | | | 358/1.15 |
| 2010/0186064 | A1* | 7/2010 | Huang | ............. H04L 12/14 |
| | | | | 726/1 |
| 2010/0277337 | A1 | 11/2010 | Brodersen et al. | |
| 2011/0007691 | A1* | 1/2011 | Awano | ............. H04W 28/06 |
| | | | | 370/328 |
| 2011/0053496 | A1* | 3/2011 | Hui | ............... H04B 7/155 |
| | | | | 455/9 |
| 2011/0239022 | A1* | 9/2011 | Tokoro | ............. G06F 1/266 |
| | | | | 713/323 |
| 2012/0090001 | A1* | 4/2012 | Yen | ............... H04N 21/43615 |
| | | | | 725/37 |
| 2013/0002949 | A1 | 1/2013 | Raveendran et al. | |
| 2013/0159565 | A1* | 6/2013 | Soyannwo | ......... G06F 9/452 |
| | | | | 710/33 |
| 2014/0157342 | A1* | 6/2014 | Yahata | ............ H04N 21/23430 |
| | | | | 725/110 |
| 2015/0036175 | A1* | 2/2015 | Yun | ............... G06F 3/1212 |
| | | | | 358/1.15 |
| 2016/0292810 | A1* | 10/2016 | Fine | ............... G06F 9/50 |

\* cited by examiner

[Fig. 1]
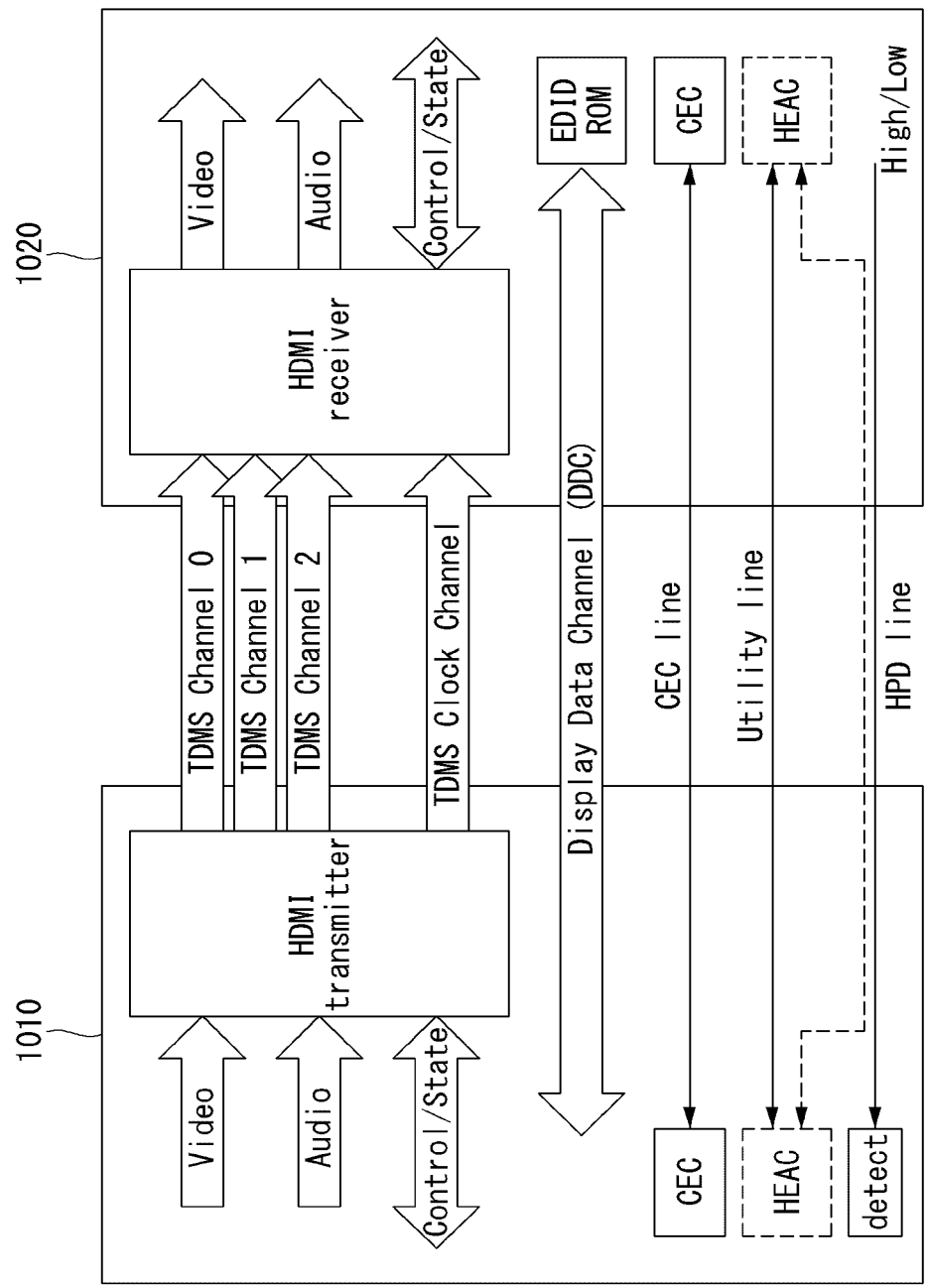

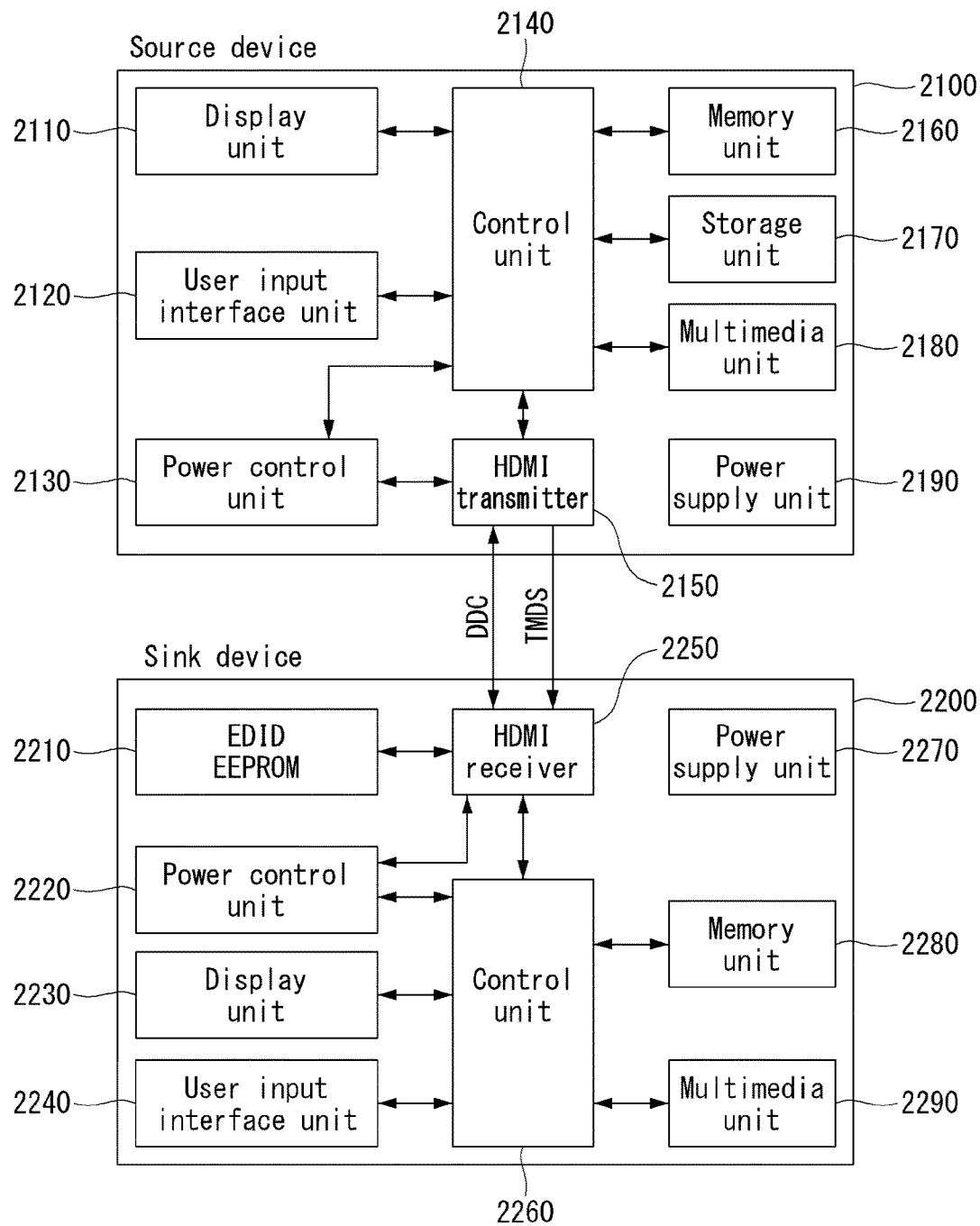
[Fig. 2]

[Fig. 3]
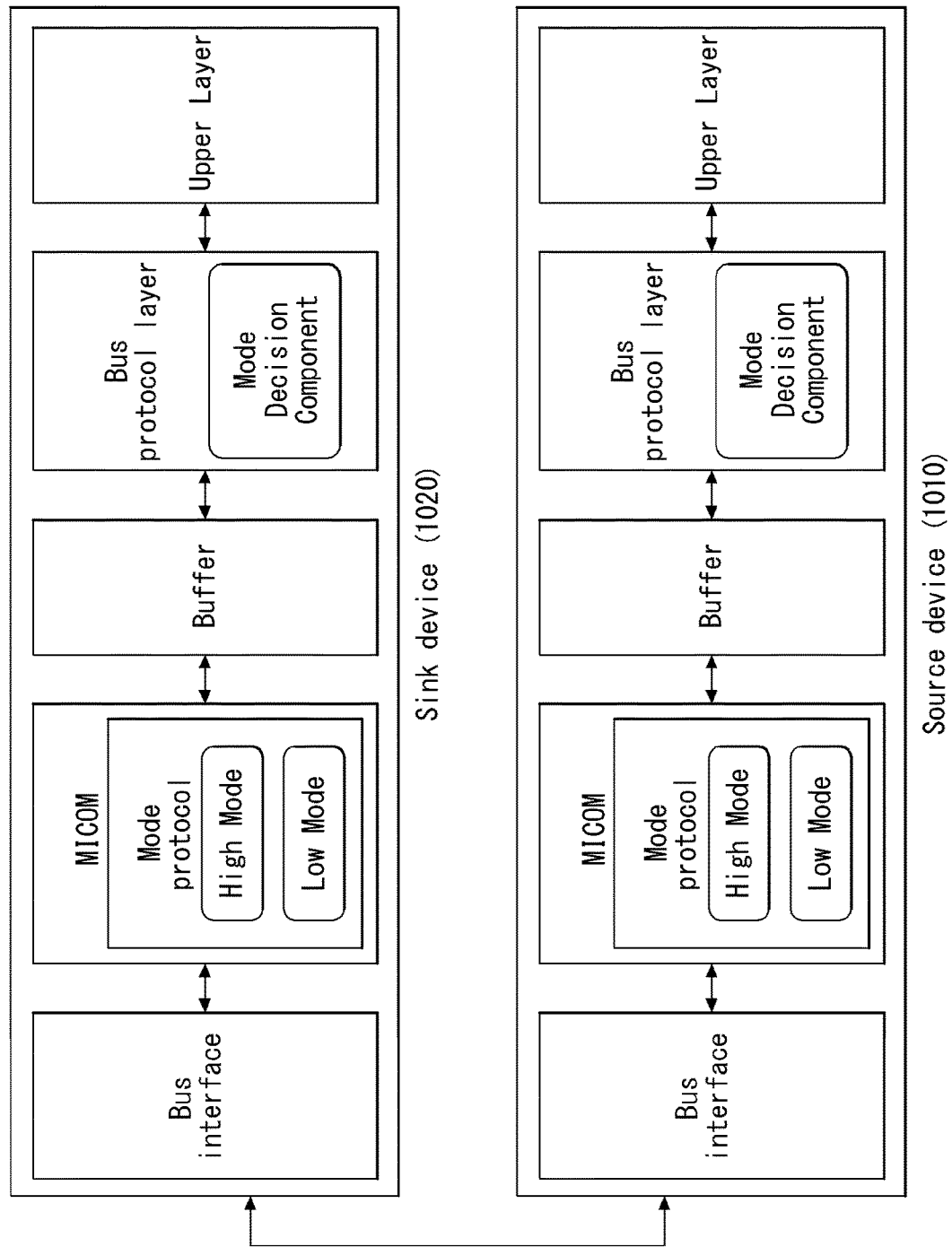

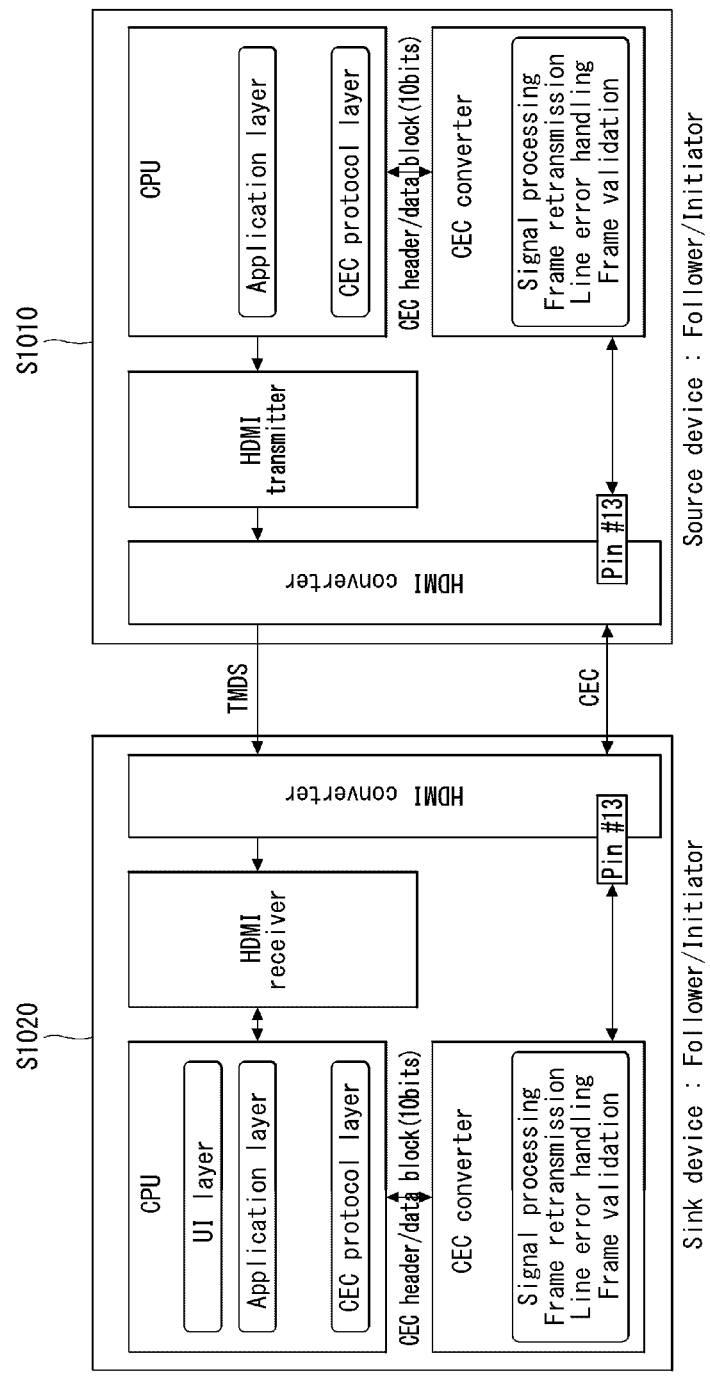
[Fig. 4]

[Fig. 5]

| Address | No. Bytes | Description |
|---|---|---|
| 00h ~ 07h | 8 | Header information. Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital), Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings. Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

【Fig. 6】

| Byte # | |
|---|---|
| 0 | Tag. 0x02 |
| 1 | Revision Number. 0x03 |
| 2 | Byte number offset d where 18-byte Detailed Timing Descriptors (DTD) begin. |
| 3 | Indication of underscan and audio support, YCbCr 4:4:4 or YCbCr 4:2:2 support, Number of native DTDs supported |
| 4 | Start of data block collection |
| d-1 | End of data block collection |
| d | Start of 18-byte DTD. Conforms to the EDID DTD format. |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

【Fig. 7】

(a) Video Data Block

| Byte # | Bits 5-7 | Bits 0-4 |
|---|---|---|
| 0 | Video Tag Code | Short Video Descriptor Total number of bytes (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | Short Video Descriptor Total number of bytes (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | Short Video Descriptor Total number of bytes (L3=3) |
| 1~3 | Speaker Allocation Data Block Payload | |

[Fig. 8]

| Byte / Bits # | 7 | 6 | 5 | 4 | 3 | 2 | 1 | 0 |
|---|---|---|---|---|---|---|---|---|
| 0 | Vendor Specific Tag Code (=3) | | | Length(=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Indpendent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| ...N | Reserved (0) | | | | | | | |

[Fig. 9]

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1`0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

[Fig. 10]
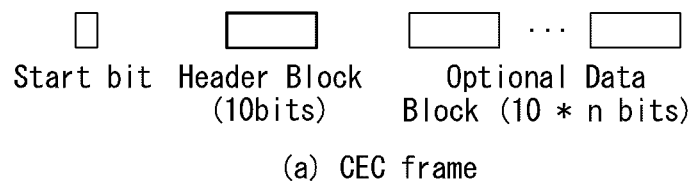
(a) CEC frame
| Name | Description |
|---|---|
| Start | Special Start 'bit' |
| Header Block | Source and Destination addresses (Logical Address) |
| Data Block 1 (opcode block) | Opcode(optional) |
| Data Block 2 (operand blocks) | Operand(s) specific to opcode (optional, depending on opcode) |
(b) CEC frame structure
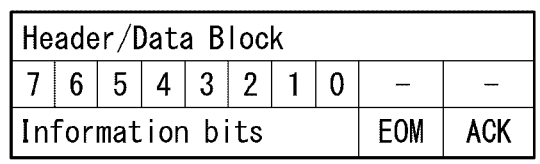
(c) CEC header/data block

[Fig. 11]

| Header/Data Block | | | | | | | | | |
|---|---|---|---|---|---|---|---|---|---|
| 7 | 6 | 5 | 4 | 3 | 2 | 1 | 0 | – | – |
| Logical Address of Initiator | | | | Logical Address of Destination | | | | EOM | ACK |

(a) Header block

| Header/Data Block | | | | | | | | | |
|---|---|---|---|---|---|---|---|---|---|
| 7 | 6 | 5 | 4 | 3 | 2 | 1 | 0 | – | – |
| Information bits | | | | | | | | EOM | ACK |

(b) Data block

[Fig. 12]
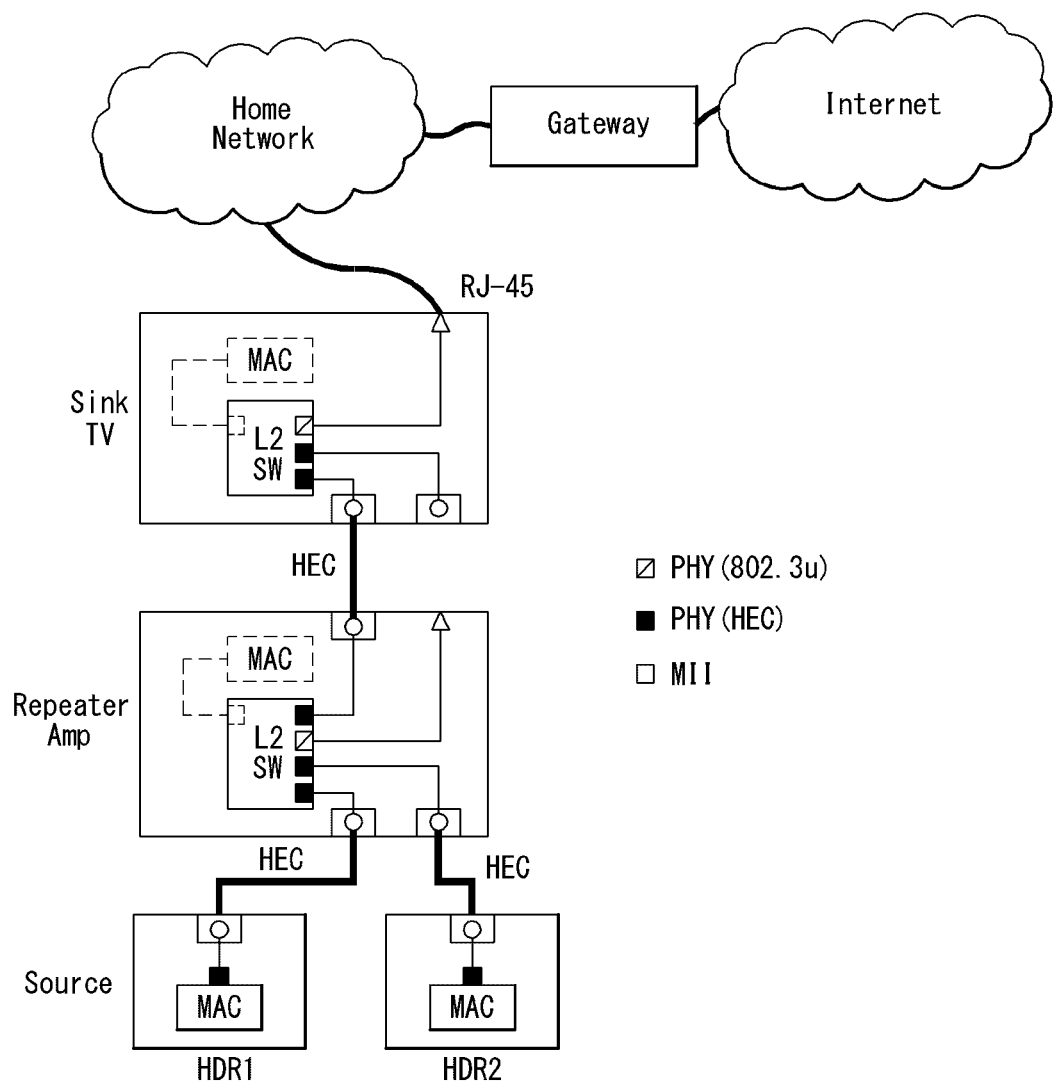

[Fig. 13]
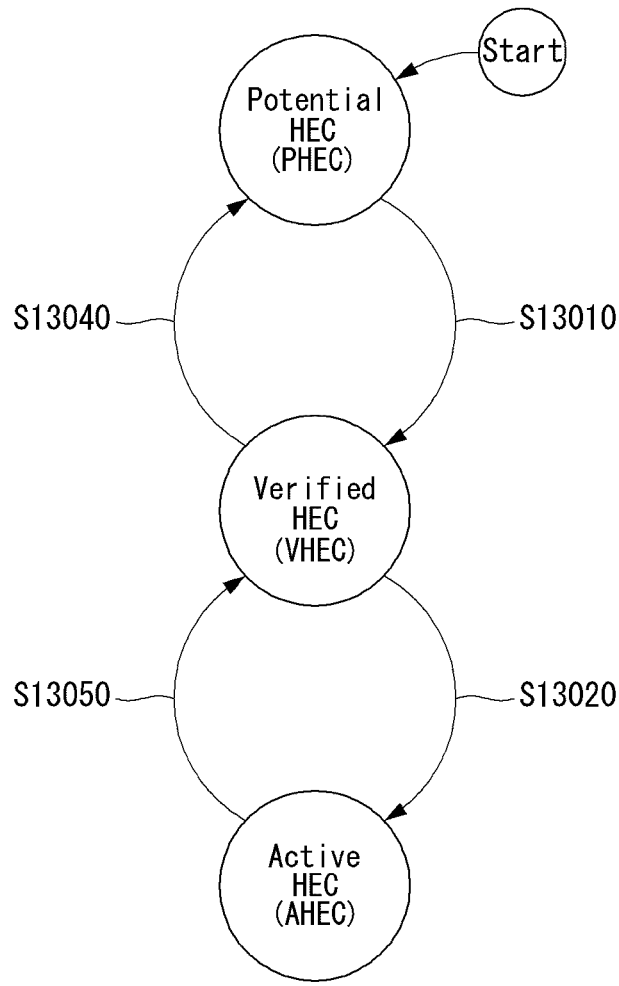
(a) Diagram of HEC channel state transition
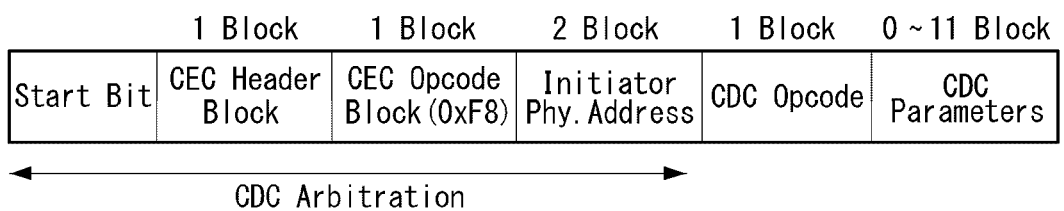
(b) CDC message frame

[Fig. 14]
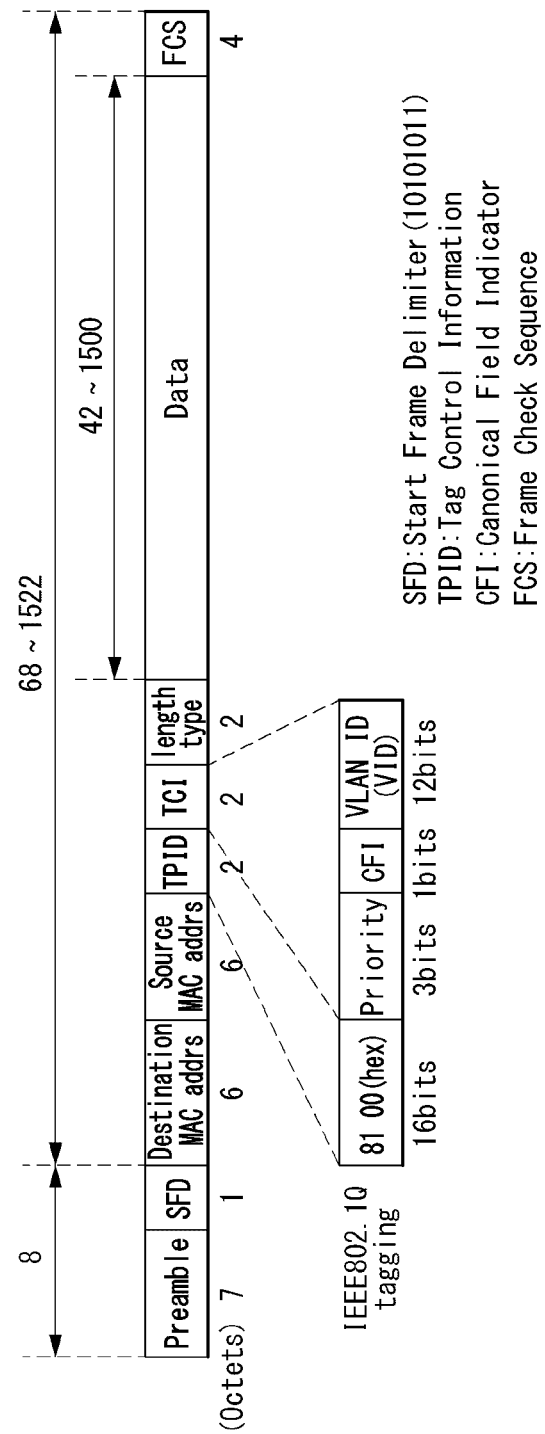

[Fig. 15]
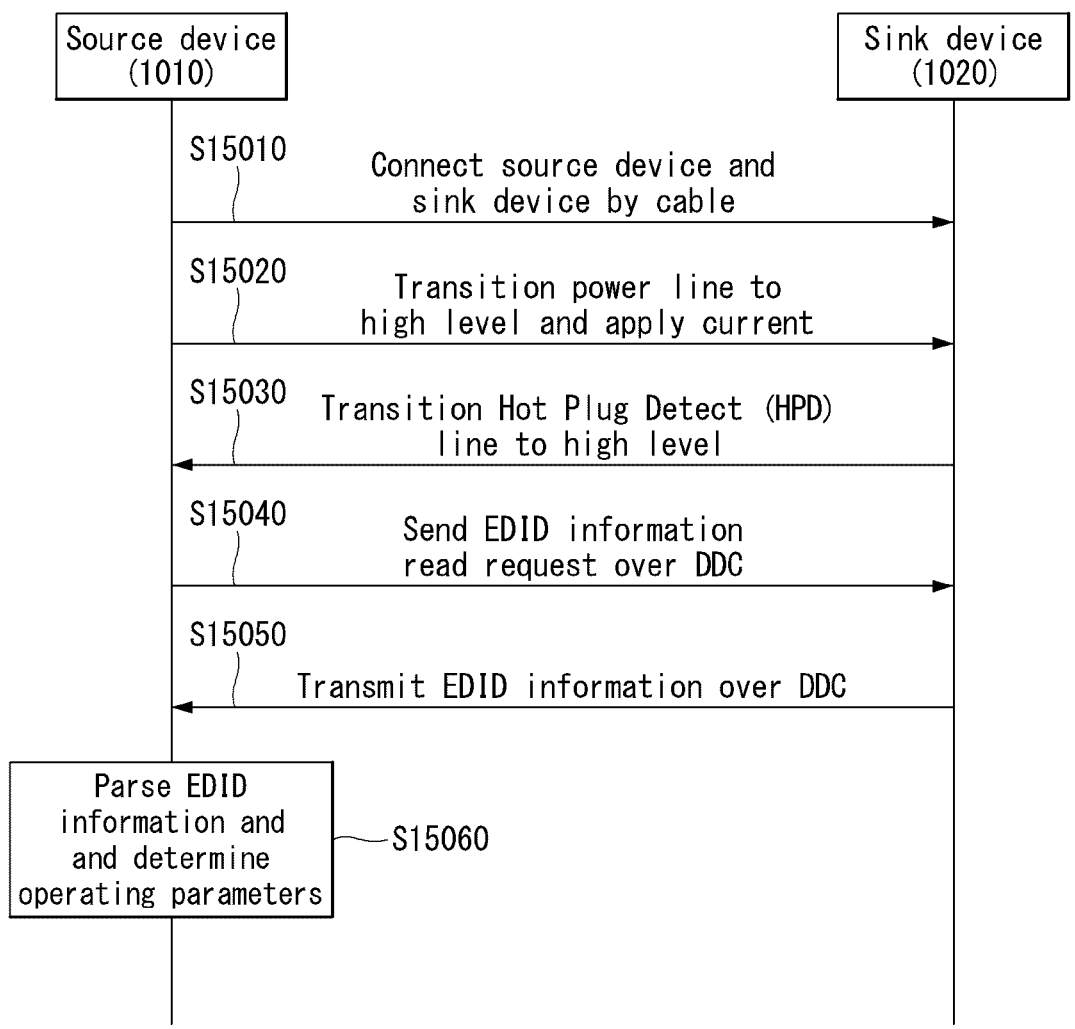

[Fig. 16]
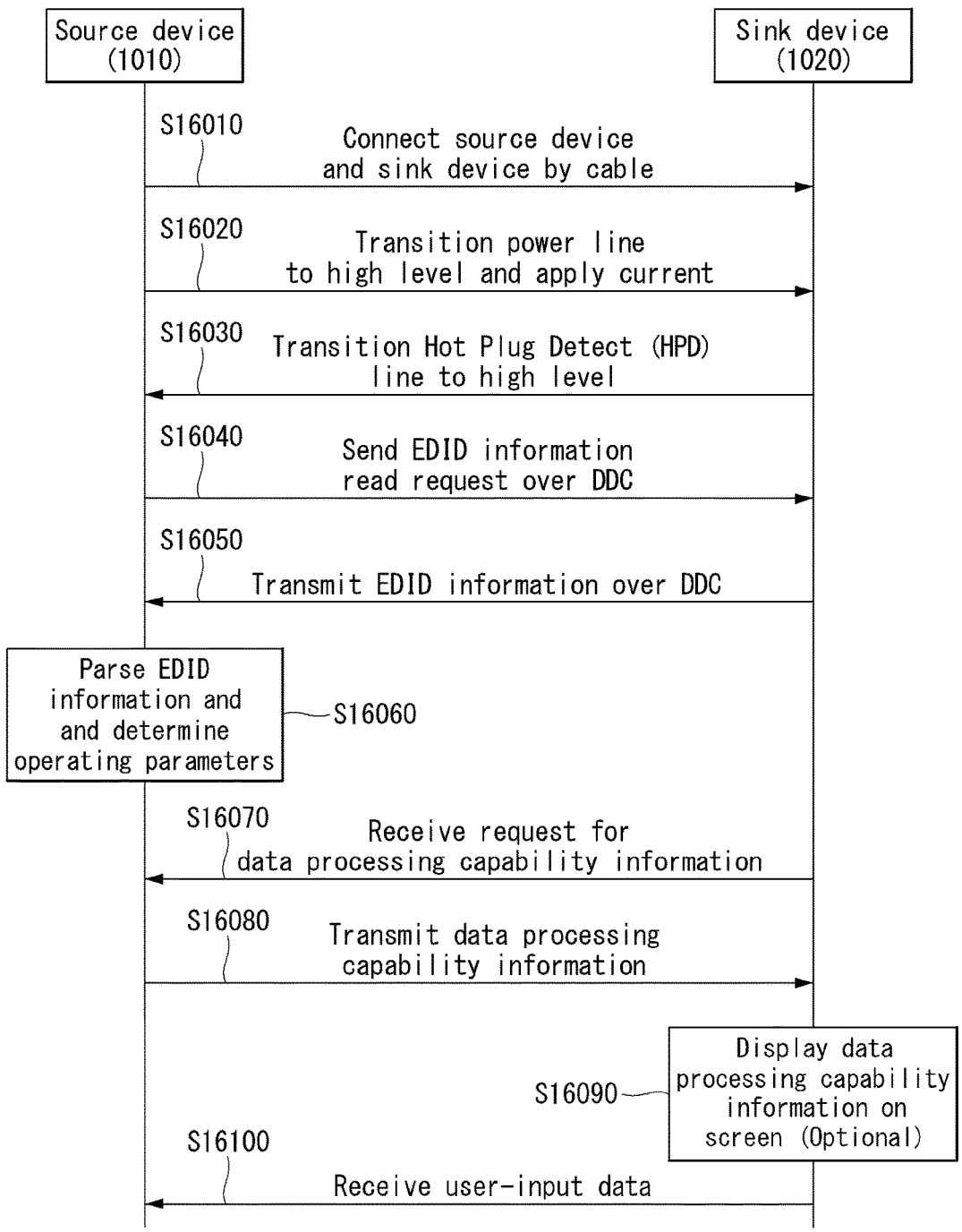

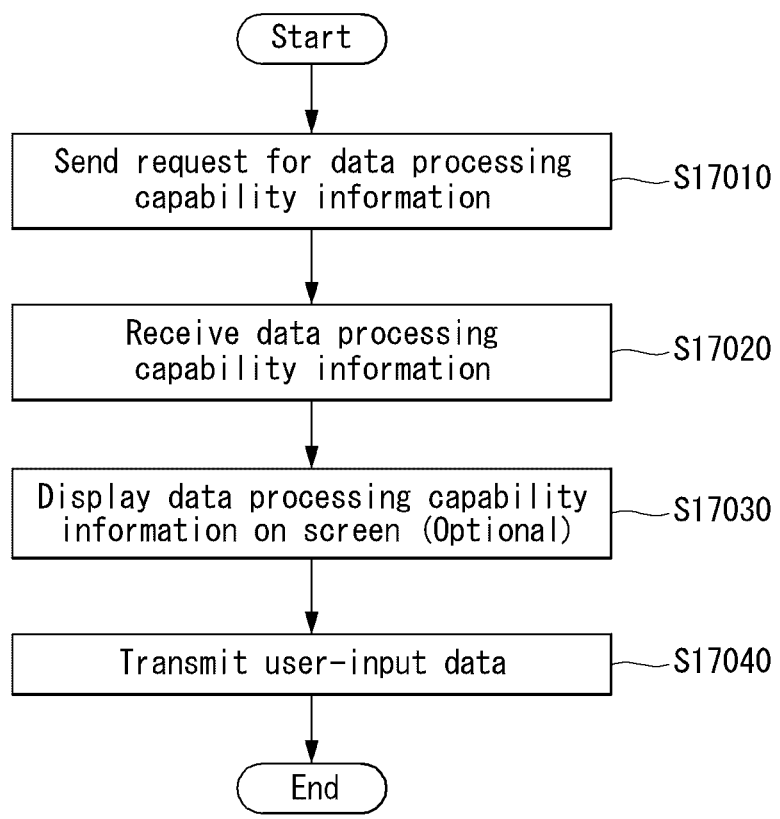
[Fig. 17]

[Fig. 18]

| Data Type | Mandatory Data | Optional Data |
|---|---|---|
| Mouse | Pointer coordinates (X, Y), click (left, right) | Other input data (wheel (up, down), double-click, additional buttons, etc.) |
| Multi-Touch | Touch ID, touch coordinates (X, Y), touch state (start, end, drag) | touch input time, other input data |
| Touch-Pen | Touch ID, touch coordinates (X, Y), touch time, touch state (start, end, drag) | Other input data (pressure, etc.) |

[Fig. 19]
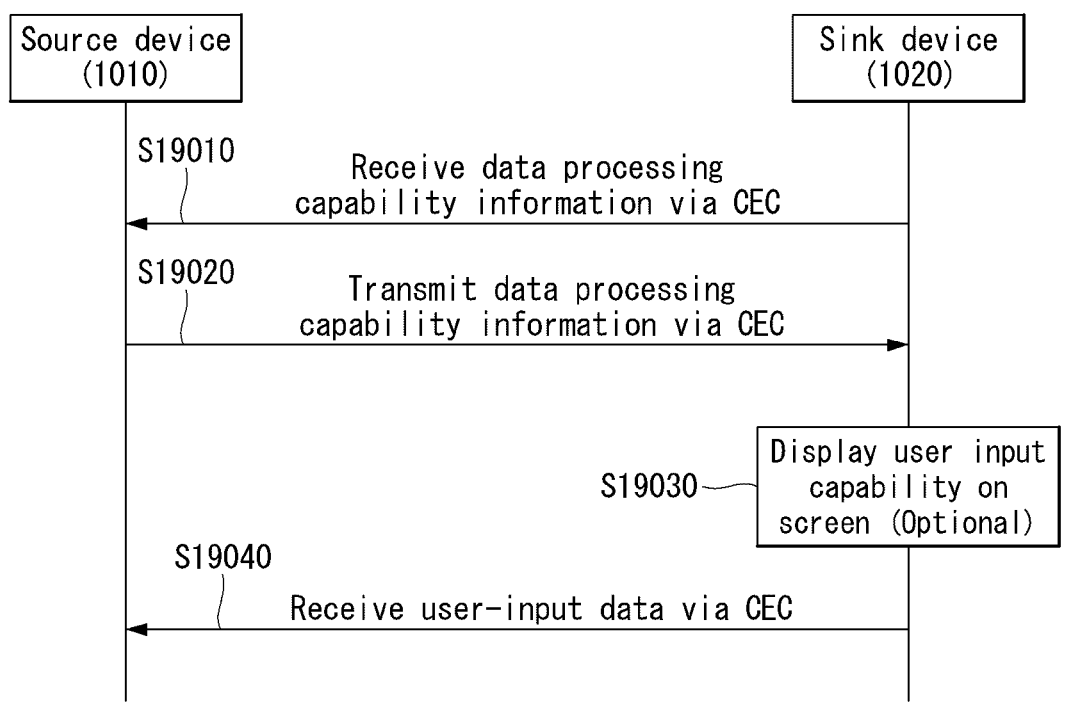

[Fig. 20]
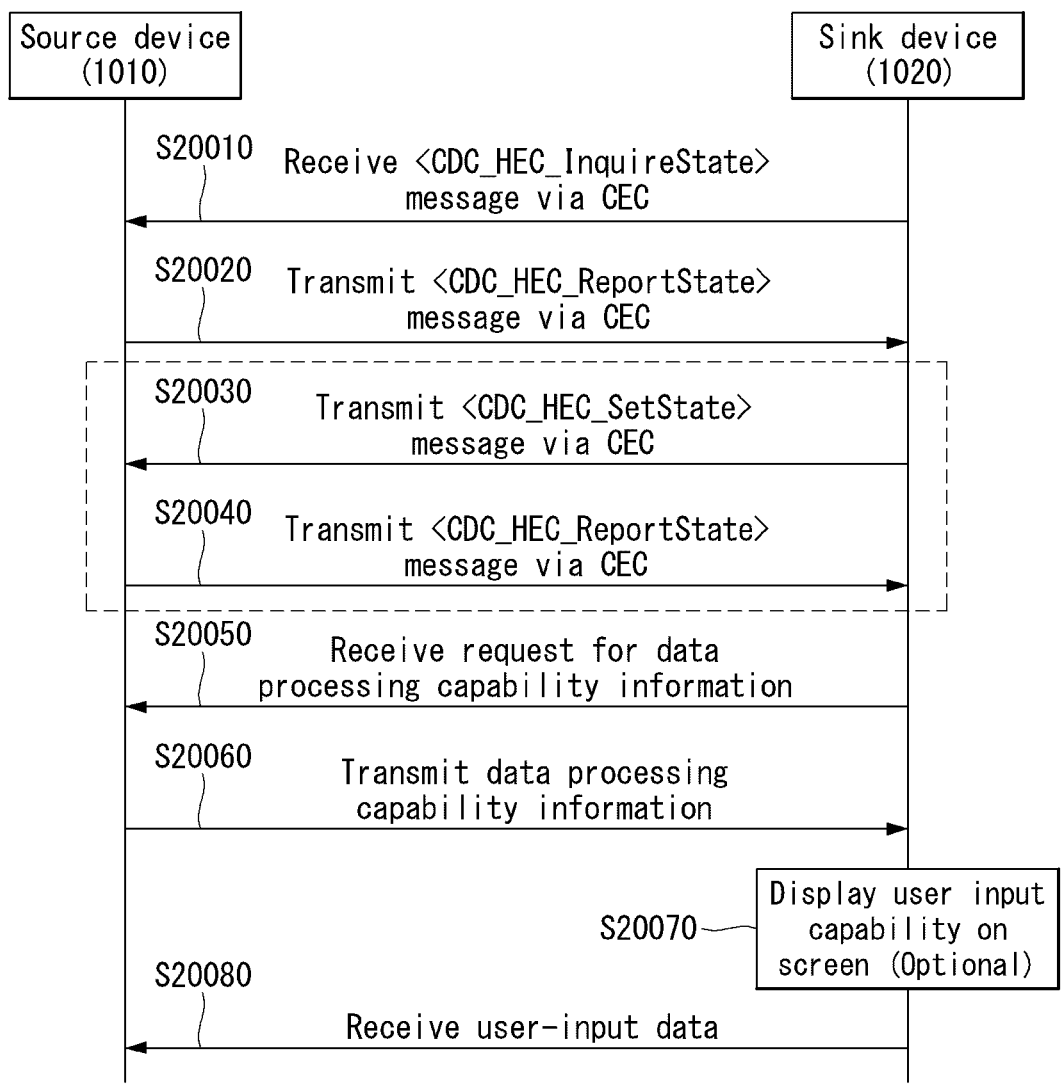

[Fig. 21]
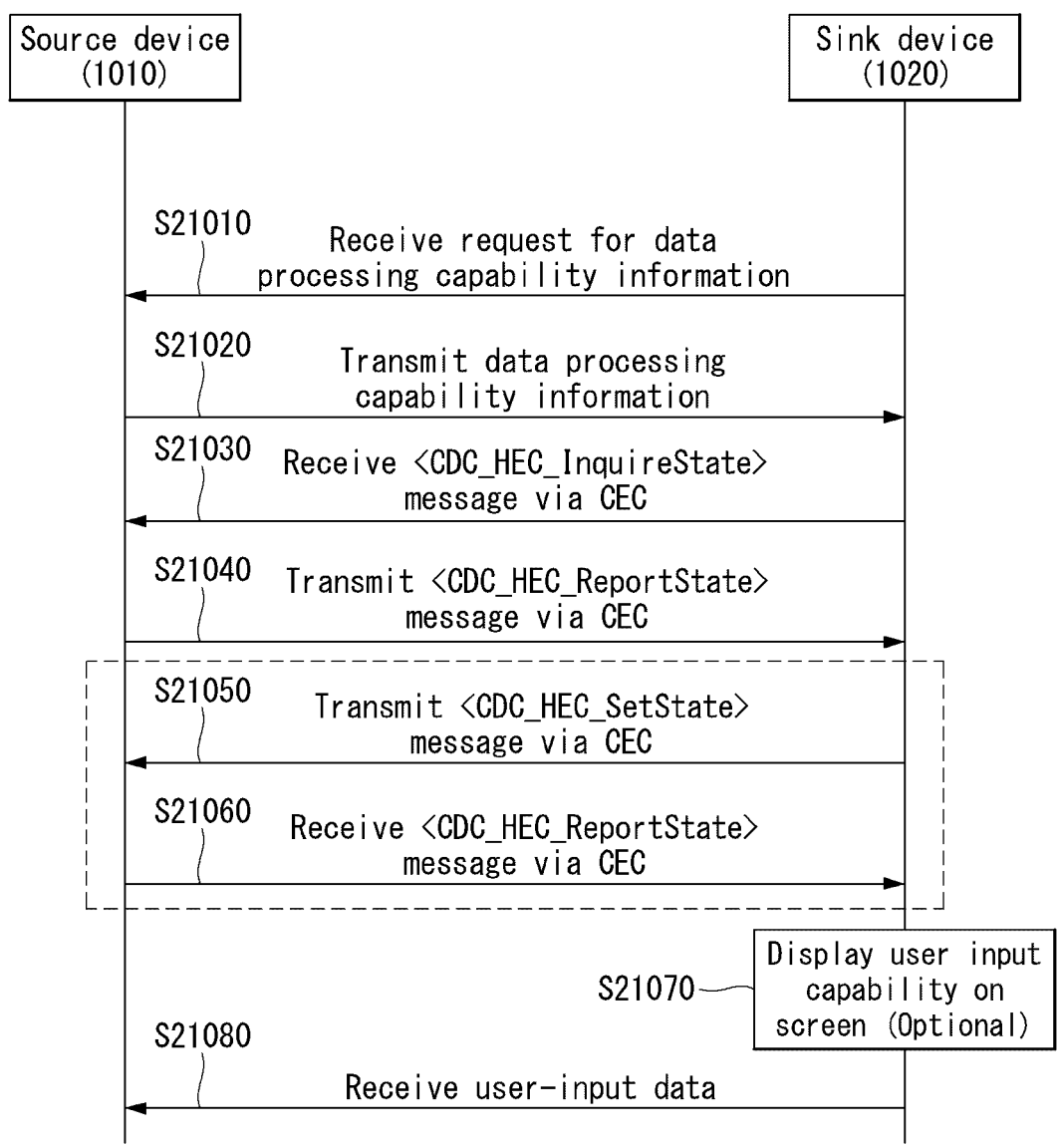

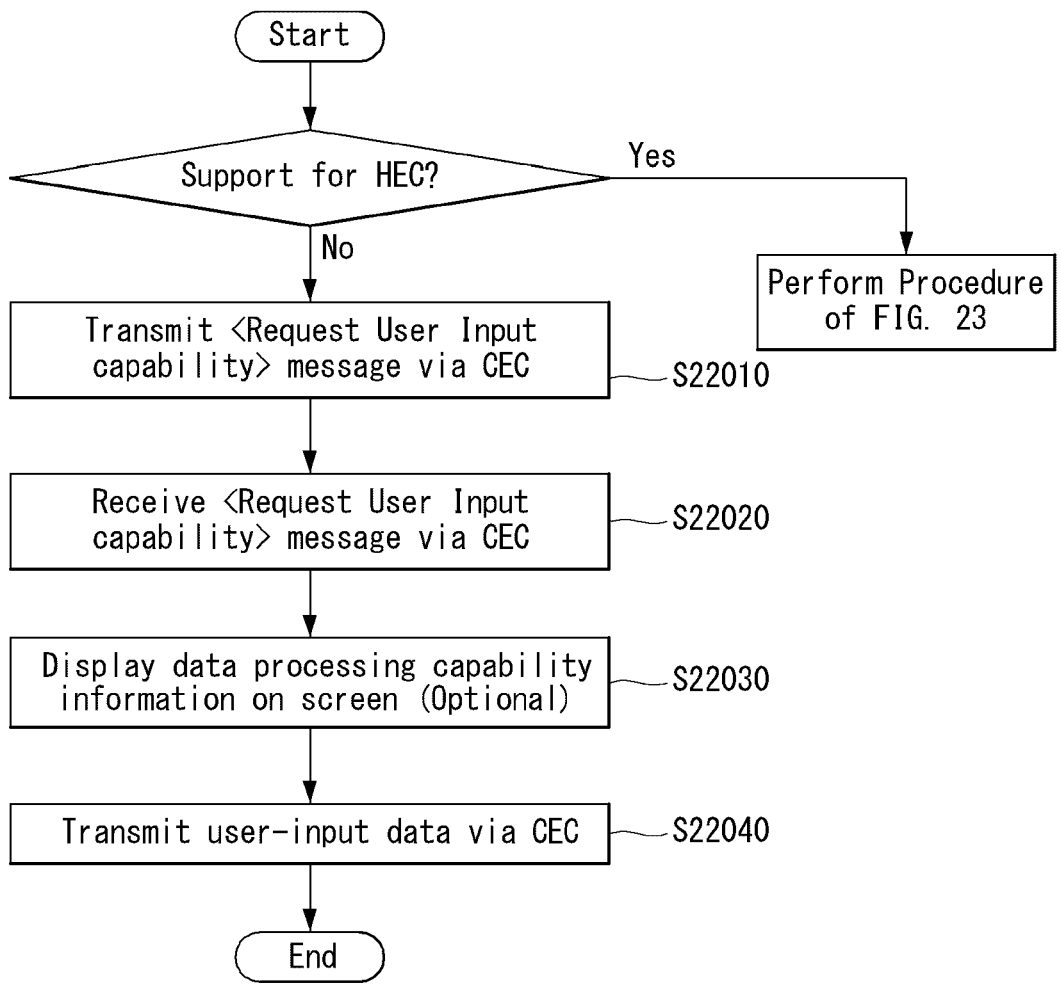

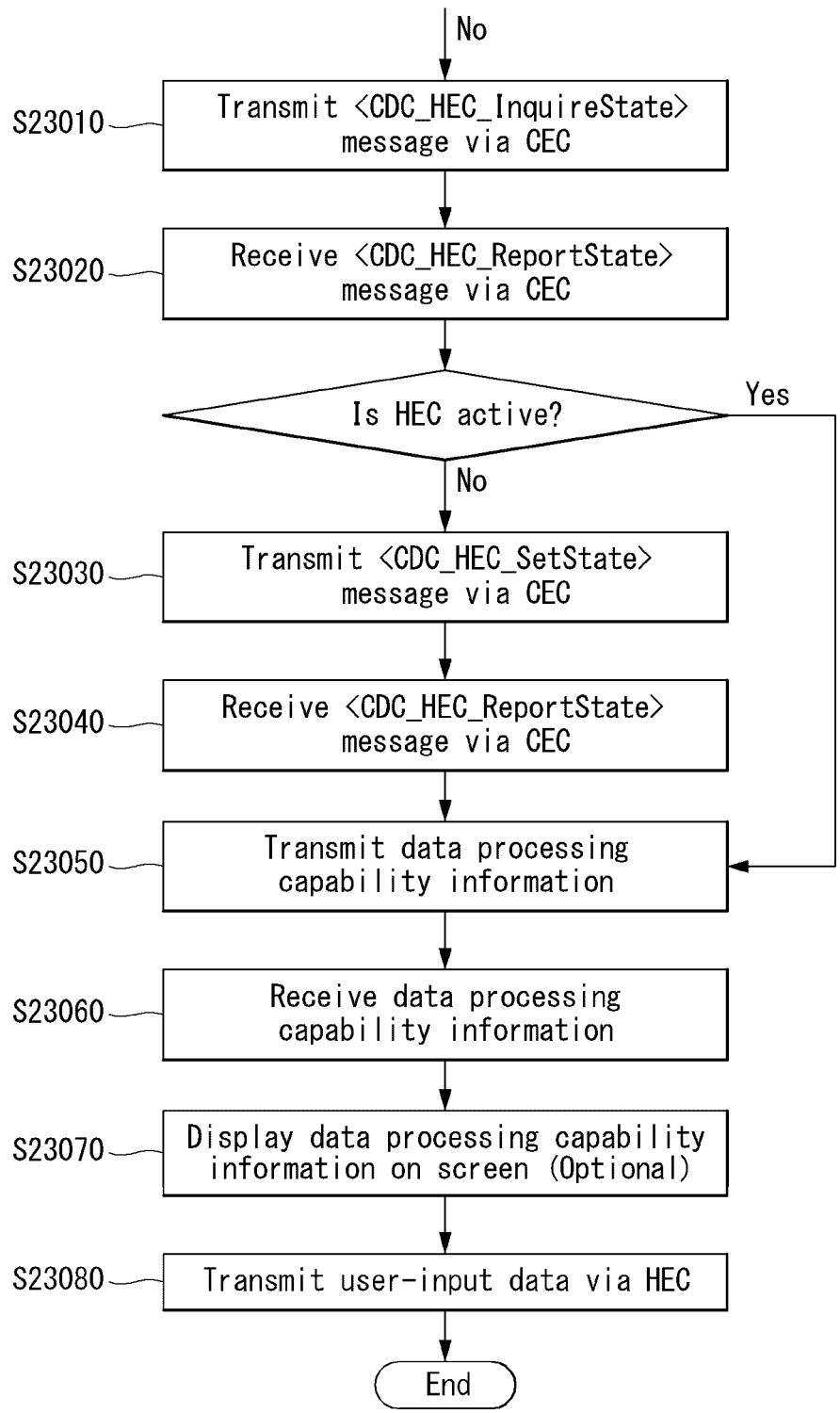

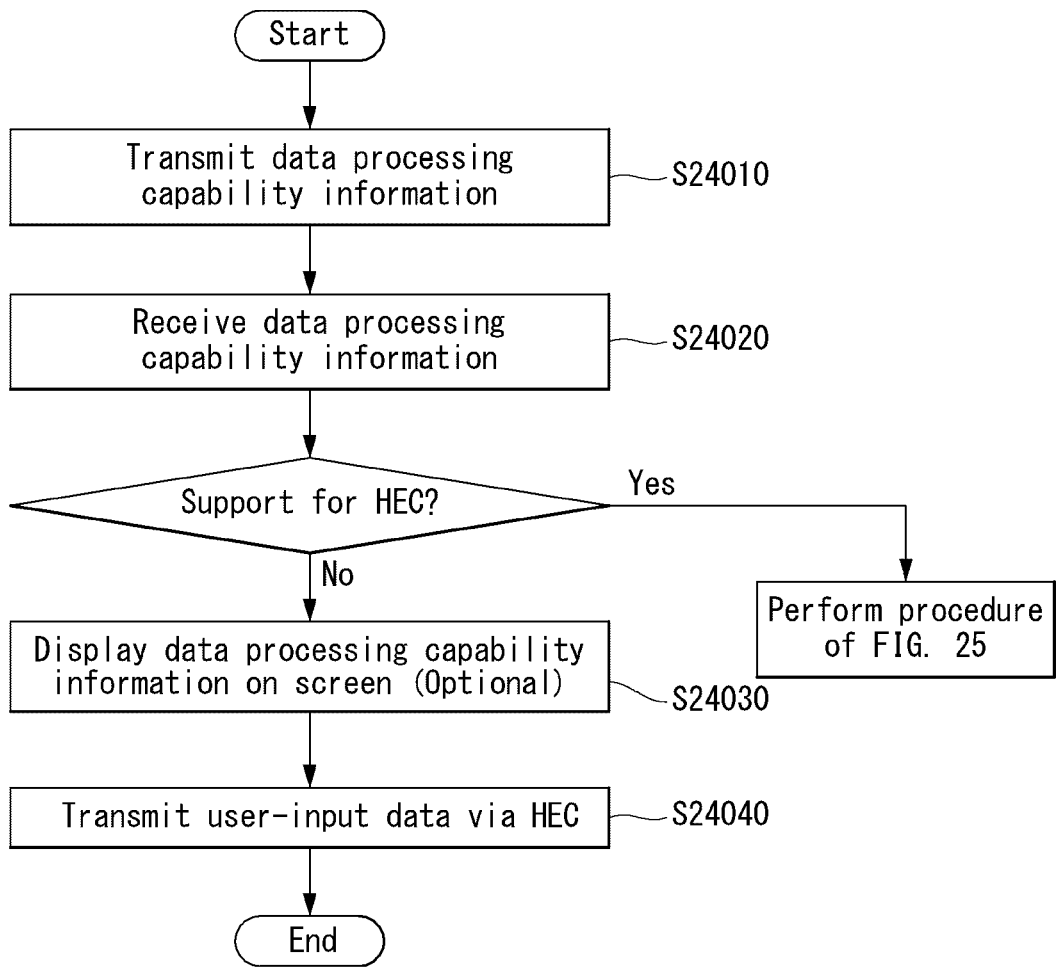
[Fig. 24]

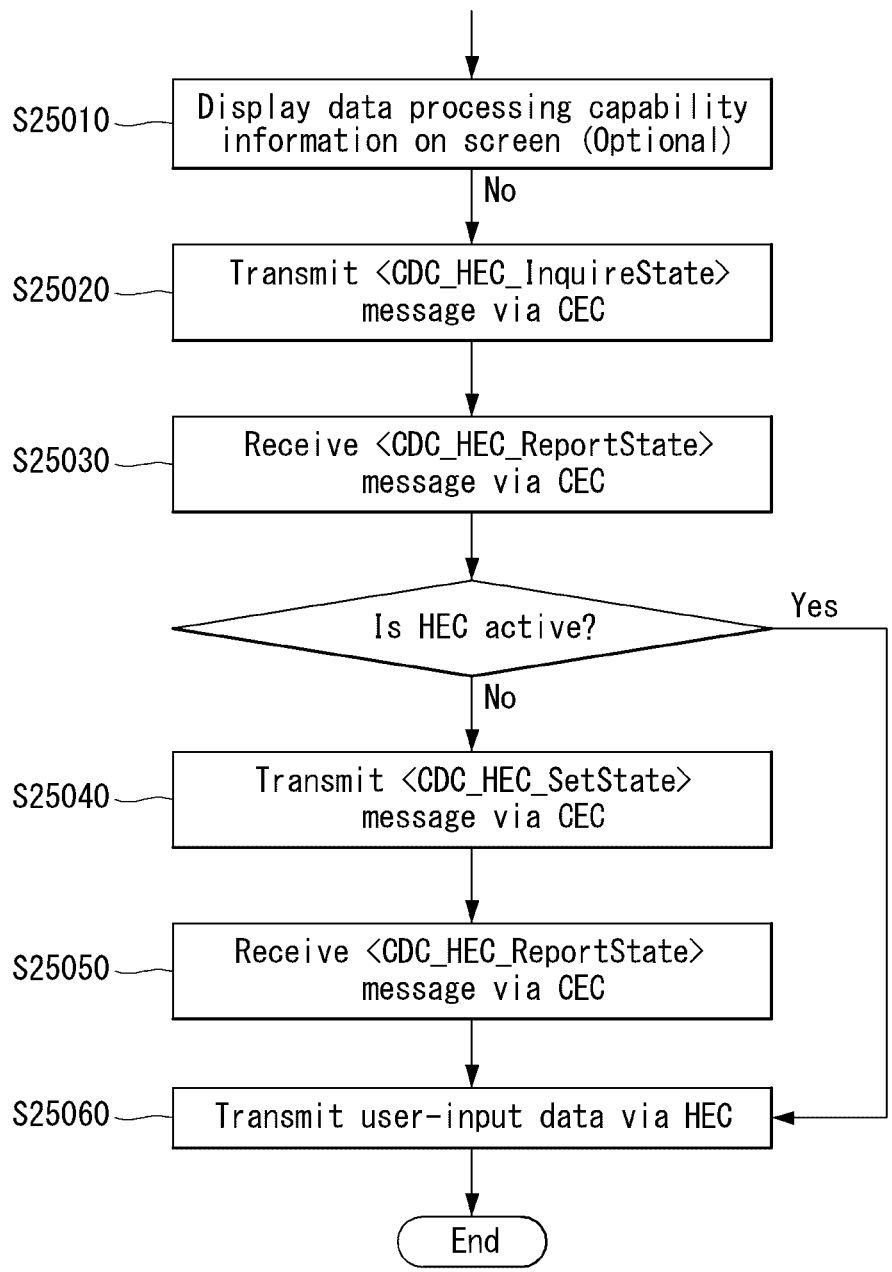
[Fig. 25]

[Fig. 26]

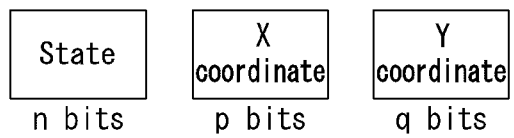

(a) Mouse data structure

| Name | Description | Size |
|---|---|---|
| State | Indicates current state of pointer<br>- Left Button (Left button click)<br>- Right Button (Right button click)<br>- Left double (Left button double-click)<br>- Scroll Up (Mouse Wheel Up)<br>- Scroll Down (Mouse Wheel Down)<br>Other states can be additionally transmitted | n bits |
| X coordinate | X coordinate of pointer | p bits |
| Y coordinate | Y coordinate of pointer | q bits |

(b) Description of mouse data block

[Fig. 27]

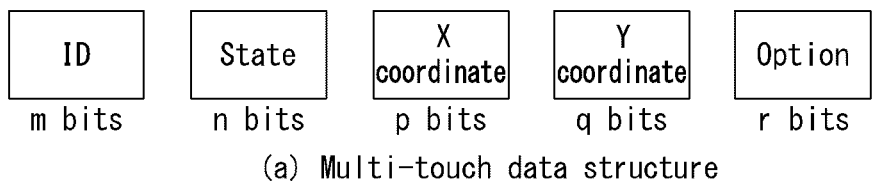

(a) Multi-touch data structure

| Name | Description | Size |
|---|---|---|
| ID | Assign ID to value recognized by touch for touch distinction | m bits |
| State | Indicates current state of pointer<br>- Action Down (Start of touch)<br>- Action Up (End of touch)<br>- Action Move (Moving)<br>Other states can be additionally transmitted | n bits |
| X coordinate | X coordinate of pointer | p bits |
| Y coordinate | Y coordinate of pointer | q bits |
| Option | 그 외 사용자에 의해 입력된 데이터 | r bits |

(b) Description of multi-touch data block

[Fig. 28]

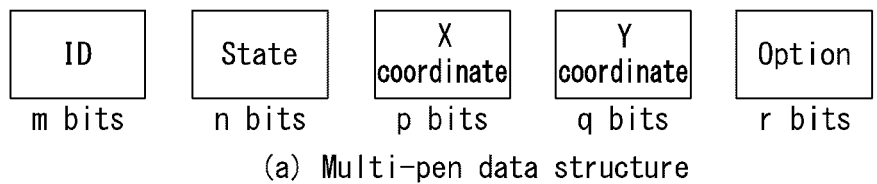

(a) Multi-pen data structure

| Name | Description | Size |
|---|---|---|
| ID | Assigns ID to value recognized by touch for multi-touch | m bits |
| State | Indicates current state of pointer<br>- Action Down (Start of touch)<br>- Action Up (End of touch)<br>- Action Move (Moving)<br>Other states can be additionally transmitted | n bits |
| X coordinate | X coordinate of pointer | p bits |
| Y coordinate | Y coordinate of pointer | q bits |
| Option | Other user-input data (ex. pressure, etc.) | r bits |

(b) Description of multi-pen data block

METHOD AND APPARATUS FOR TRANSMITTING AND RECEIVING DATA USING HDMI

CROSS REFERENCE TO RELATED APPLICATIONS

This application is the National Stage filing under 35 U.S.C. 371 of International Application No. PCT/KR2015/005958, filed on Jun. 12, 2015, which claims priority under 35 U.S.C. § 119(e) to U.S. Provisional Application No. 62/011,049, filed on Jun. 12, 2014, the contents of which are all hereby incorporated by reference herein in their entirety.

TECHNICAL FIELD

The present invention relates to a method and device for transmitting and receiving data using HDMI (High-Definition Multimedia Interface), and more particularly, to a method and device for transmitting and receiving user-input data between a sink device and a source device via HDMI.

BACKGROUND ART

HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

DISCLOSURE

Technical Problem

An aspect of the present invention is to provide a method for transmitting and receiving data between a sink device and a source device via HDMI.

Another aspect of the present invention is to provide a method for transmitting and receiving user-input data between a sink device and a source device.

A still another aspect of the present invention is to provide a method for transmitting and receiving data input from a sink device with user input functionality.

A further aspect of the present invention is to provide a method for transmitting and receiving data input through a mouse with user input functionality, multi-touch, a mouse, and a touch-pen via HDMI.

A further aspect of the present invention is to provide a method for transmitting user input data of a processable type through HDMI by confirming whether user input data can be processed between a sink device and a source device.

Technical problems to be solved by the present invention are not limited to the above-mentioned technical problem, and other technical problems not mentioned above can be clearly understood by one skilled in the art from the following description.

Technical Solution

To solve the above-described problems, the present invention provides a method and device for transmitting and receiving data using HDMI (High-Definition Multimedia Interface).

Specifically, a method for a source device to transmit and receive data according to one embodiment of the present invention includes: receiving a request from a sink device to transmit data processing capability information indicating whether the source device is capable of processing user-input data or not; transmitting the data processing capability information to the sink device; and receiving the user-input data from the sink device.

In the present invention, the data processing capability information further includes data type information indicating the type of the user-input data.

In the present invention, the data type information includes at least one of mouse type information, multi-touch type information, touch type information, or touch-pen type information which indicate the method of inputting the user-input data.

In the present invention, the user-input data is received over an HDMI CEC (Consumer Electronics Control) channel or an HEC (HDMI Ethernet Channel).

In the present invention, when the user-input data is received over the HEC, the method further comprises: receiving from the sink device an inquiry message requesting state information indicating whether the HEC is available or not; and transmitting to the sink device a first reporting message containing the state information, wherein the state information indicates either the active or inactive state of the HEC.

In the present invention, when the state information indicates the inactive state of the HEC, the method further comprises: receiving from the sink device a set message for activating the HEC; and activating the HEC and transmitting to the sink device a second reporting message containing state information indicating the active state of the HEC.

Further, the present invention provides a method for a sink device to transmit and receive data, the method including: requesting data processing capability information indicating whether or not the user input data can be processed to the source device; receiving the data processing capability information from the source device; and transmitting the user-input data to the source device.

In the present invention, the data processing capability information further includes data type information indicating the type of the user-input data.

In the present invention, the data type information includes at least one of mouse type information, multi-touch type information, touch type information, or touch-pen information which indicate the method of inputting the user-input data.

In the present invention, the user-input data is transmitted over an HDMI CEC (Consumer Electronics Control) channel or an HEC (HDMI Ethernet Channel).

In the present invention, when the user-input data is transmitted over the HEC, the method further comprises: transmitting to the source device an inquiry message requesting state information indicating whether the HEC is available or not; and receiving from the source device a first reporting message including the state information, wherein the state information indicates either the active or inactive state of the HEC.

In the present invention, when the state information indicates the inactive state of the HEC, the method further includes: transmitting to the source device a set message for activating the HEC; and receiving from the source device a second reporting message containing state information indicating the active state of the HEC, after activating the HEC.

Further, the present invention provides a source device for transmitting and receiving data using HDMI (High Definition Media Interface), the source device including: an HDMI transmitter for transmitting and receiving data via HDMI; and a control unit for controlling the HDMI transmitter, wherein the source device receives a request from a sink device to transmit data processing capability information indicating whether the source device is capable of processing user-input data or not, transmits the data processing capability information to the sink device, and receives the user-input data from the sink device.

In the present invention, the data processing capability information further includes data type information indicating the type of the user-input data.

In the present invention, the user-input data is received over an HDMI CEC (Consumer Electronics Control) channel or an HEC (HDMI Ethernet Channel).

In the present invention, when the user-input data is received over the HEC, the source device receives from the sink device an inquiry message requesting state information indicating whether the HEC is available or not, and transmits to the sink device a first reporting message containing the state information, wherein the state information indicates either the active or inactive state of the HEC.

Further, the present invention provides a sink device for transmitting and receiving data using HDMI (High Definition Media Interface), the sink device including: an HDMI transmitter for transmitting and receiving data via HDMI; and a control unit for controlling the HDMI transmitter, wherein the sink device requests data processing capability information indicating whether or not the user input data can be processed to the source device, receives the data processing capability information from the source device, and transmits the user-input data to the source device.

In the present invention, the data processing capability information further includes data type information indicating the type of the user-input data.

In the present invention, the user-input data is transmitted over an HDMI CEC (Consumer Electronics Control) channel or an HEC (HDMI Ethernet Channel).

In the present invention, when the user-input data is transmitted over the HEC, the sink device transmits to the source device an inquiry message requesting state information indicating whether the HEC is available or not, and receives from the source device a first reporting message containing the state information, wherein the state information indicates either the active or inactive state of the HEC.

Advantageous Effects

A method for transmitting and receiving data using HDMI according to one embodiment of the present invention has the advantage of transmitting and receiving data between a sink device and a source device.

The present invention may provide bi-directional communication that enable a source device and a sink device to transmit and receive user-input data.

The present invention may allow for transmitting user-input data to a source device through a sink device with user input functionality.

The present invention may allow a sink device and a source device to transmit and receive processable user-input data by exchanging information indicating whether they can process user-input data or not.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

FIG. 1 illustrates an HDMI system and data transmission and reception channels included in the HDMI system according to one embodiment of the present invention.

FIG. 2 illustrates a source device and a sink device in a HDMI system according to an embodiment of the present invention.

FIG. 3 illustrates a general HDMI system according to an embodiment of the present invention.

FIG. 4 illustrates an HDMI system using CEC according to an embodiment of the present invention.

FIG. 5 illustrates an EDID structure according to an embodiment of the present invention.

FIGS. 6 to 7 illustrate an embodiment of an EDID extension block.

FIG. 8 illustrates an HF (HDMI Forum)-VSDB (Vendor-Specific Data Block) according to an embodiment of the present invention.

FIG. 9 illustrates an SCDC (Status and Control Data Channel) structure according to an embodiment of the present invention.

FIG. 10 illustrates a structure of a CEC message according to an embodiment of the present invention.

FIG. 11 illustrate an example of header and a data block of a CEC message according to an embodiment of the present invention.

FIG. 12 illustrates a method of transmitting and receiving data over HEAC (HDMI Ethernet Audio Channel) of HDMI according to an embodiment of the present invention.

FIG. 13 illustrates a state transition of an HEC channel and a CDC (Capability Discovery and Control) message according to an embodiment of the present invention.

FIG. 14 illustrates a MAC frame format according to an embodiment of the present invention.

FIG. 15 illustrates a method for transmitting and receiving A/V data according to an embodiment of the present invention.

FIG. 16 illustrates a method for transmitting user-input data from a sink device to a source device according to an embodiment of the present invention.

FIG. 17 illustrates a method for transmitting user-input data from a sink device according to an embodiment of the present invention.

FIG. 18 illustrates types of user-input data according to an embodiment of the present invention.

FIG. 19 illustrates a method for transmitting user-input data via HDMI CEC (Consumer Electronics Control) according to an embodiment of the present invention.

FIG. 20 illustrates a method for transmitting user-input data over HEC (HDMI Ethernet Channel) according to an embodiment of the present invention.

FIG. 21 illustrates a method for transmitting user-input data over HEC (HDMI Ethernet Channel) according to another embodiment of the present invention.

FIGS. 22 and 23 illustrate a method for transmitting user-input data from a sink device over HEC (HDMI Ethernet Channel) according to another embodiment of the present invention.

FIGS. 24 and 25 illustrate a method for transmitting user-input data from a sink device over HEC (HDMI Ethernet Channel) according to another embodiment of the present invention.

FIGS. 26 to 28 illustrate data structures for different data types of user input data according to an embodiment of the present invention.

BEST MODE

The above aspects, features and advantages of the present invention will become apparent from the following detailed description when taken in conjunction with the accompanying drawings. However, the present invention may be subjected to various modifications and have various embodiments. Specific embodiments are illustrated in the drawings and described in detail below. Throughout the specification, like reference numerals refer to like elements. When it is deemed that a detailed description of known functions or configurations may unnecessarily obscure the subject matter of the present invention, a detailed description thereof will be omitted.

FIG. 1 illustrates an HDMI system and data transmission and reception channels included in the HDMI system according to one embodiment of the present invention.

Devices that transmit and receive video/audio/control data using HDMI can be called collectively an HDMI system, and the HDMI system can comprise a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out E-EDID (Enhanced Extended Display Identification Data) of the sink device in the DDC (Display Data Channel). In what follows, the E-EDID may be called EDID information.

A utility line can be used for an optional extension function such as HEAC.

FIG. 2 illustrates a source device and a sink device in a HDMI system according to an embodiment of the present invention.

In the HDMI system, the device that transmits video/audio data through HDMI corresponds to the source device 2100, and the device that receives video/audio data through HDMI corresponds to the sink device 2200.

The source device 2100 can include at least one of a display unit 2110, user input interface unit 2120, video encoding unit (video encoder) 2130, control unit 2140, HDMI transmitter 2150, memory unit 2160, storage unit 2170, multimedia unit 2180, or power supply unit 2190. The sink device 2200 can include at least one of an EDID EEPROM 2210, video decoding unit 2220, display unit 2230, user input interface unit 2240, HDMI receiver 2250, control unit 2260, power supply unit 2270, memory unit 2280, or multimedia unit 2290. In what follows, descriptions about units performing the same operation will not be repeated.

The source device 2100 represents a physical device transmitting or streaming contents stored in the storage unit to the sink device 2200. The source device 2100 can send a request message to the sink device; or receive and process a request message from the sink device. Also, the source device 2100 can provide an UI through which a response message that the sink device 2200 transmits with respect to a transmitted request message is processed and delivered to the user, and in case the source device 2100 includes the display unit 2110, the UI can be displayed.

The sink device 2200 can receive contents from the source device 2100, transmit a request message to the source device 2100, or transmit a response message by processing a message received from the source device 2100. The sink device 2200 can also provide an UI through which a response message received from the source device 2100 is processed and delivered to the user, and in case the sink device 2200 includes the display unit 2230, the UI can be displayed.

The source device 2100 and the sink device 2200 can include a user input interface unit 2120, 2240 that receives the user's action or input, and as an example, the user input interface 2120, 2240 can correspond to a remote controller, voice reception/recognition device, or touch input sensing/receiving device.

The memory unit 2160, 2280 represents a volatile physical device in which various types of data are stored temporarily.

The storage unit 2170 represents a nonvolatile physical device in which various types of data can be stored.

The EDID EEPROM 2210 represents an EEPROM that stores EDID information.

The aforementioned memory unit, storage unit, and EDID EEPROM all perform the function of storing data, which may be called collectively a memory unit.

The display unit 2110, 2230 displays data received through HDMI, data stored in a content storage, or UI on a screen according to the control of the control unit.

The multimedia unit 2180, 2290 plays various types of multimedia contents. The multimedia unit 2180, 2290 may be implemented independently of the control unit 2140, 2260 or implemented as one physical component together with the control unit.

The power supply unit 2190, 2270 supplies power required for operating a source device, sink device, and sub-units belonging to the source and sink devices.

The HDMI transmitter 2150 is the unit that is installed in the source device 2100 and transmits and receives data through HDMI. The HDMI transmitter 2150 transmits and receives data including a command between devices and a request, action, or response message as well as audio/video data.

The video encoding unit 2130 compresses video data to be transmitted through the HDMI transmitter 2150.

The HDMI receiver 2250 is the unit that is installed in the sink device 2200 and transmits and receives data through HDMI. The HDMI receiver 2250 transmits and receives data including a command between device The video decoding unit 2130 performs decompression of compressed video data received through the HDMI receiver 2250.

In what follows, channels, data structure, and functions provided by the HDMI will be described in more detail.

As described above, the HDMI system provides a DDC (Display Data Channel), which is a protocol standard defined by the VESA (Video Electronics Standard Association) specifying transmission of digital information between the monitor and the computer graphic adaptor. HDMI devices can transmit information about display modes supported by the monitor to the graphic adaptor through the DDC, and the graphic adaptor can transmit images to the monitor according to the information. Before the DDC standard is approved, the VGA standard defined four pins (Pin 11, 12, 4, and 15) of an analog VGA connector for the purpose of recognizing monitor types; among the four pins, only the pin 11, 12, and 4 have been actually used, and 7 types of monitor types could be recognized. The following provide DDC specifications for the respective versions.

DDC version 1 (approved in 1994)

EDID (Extended Display Identification Data) is defined, which is a binary file format specifying monitoring information.

Pin 12 is used as a data line, and an EDID block of 128 byte is transmitted consecutively from a monitor to a computer.

DDC version 2 (approved in 1996)

EDID is no longer defined by the DDC, but specified separately as a companion standard.

DDC version 2 is based on I2C serial bus. Pin 12 is now used as the data line, and pin 15 is used as the clock line of I2C bus.

Pin 9 is used to supply 5V DC power (up to 50 mA) from the computer to the monitor to read the EDID stored in the EEPROM even if the monitor is powered off.

DDC version 2 uses an 8 bit data offset and supports the EDID storage capacity ranging from 28 bytes to 256 bytes.

E-DDC

E-DDC replaces the DDC version 1 and 2, and version 1 was introduced in 1999. To use E-EDID (Enhanced EDID), the E-DDC allows up to 32 Kbytes of display information storage capacity.

By employing a new I2C addressing scheme based on 8-bit segment index (0x00~0x7F), 128 segments (1 segment=256 bytes) can be accessed, by which up to 32 bytes can be accessed.

E-DDC version 1.1 was approved in 2004, which supports a video interface such as HDMI in addition to CE devices and VGA.

E-DDC version 1.2 was approved in 2007, which supports display port and display ID In what follows, EDID provided through the DDC will be described.

FIG. 3 illustrates a general HDMI system according to an embodiment of the present invention.

A general HDMI system may largely include an HDMI sink device 1020 and an HDMI source device 1010, and the sink device 1020 and the source device 1010 may include a bus interface, a micro controller (MICOM), a buffer, a bus protocol layer, and an upper layer.

In various embodiments according to the present invention, the sink device 1020 may be called a receiver or an initiator, and the source device 1010 may be called a transmitter or a follower, depending on the situation.

Here, the initiator may refer to a device that initiates, transfers, and controls a command, and the follower may refer to a device that responds to a command, implements a request, and informs of the result.

The sink device 1020 may include, for example, a TV and a repeater, and the source device 1010 may include, for example, a DVD player, a set-top box (STB), a personal computer (PC), a laptop, and a recorder.

The bus interface refers to a physical device that enables device-to-device transfer of data or messages such as commands, requests, actions, responses, etc.

The buffer refers to a physical device that temporarily stores sent messages or data to improve the reliability of the messages or data.

The MICOM refers to a physical device that generates a signal for data transfer or manages transmission priorities, retransmissions for reliable transfer, etc.

The MICOM includes a mode protocol, and the mode protocol refers to a protocol that manages efficient resources needed for high-speed and low-speed data transmissions. The mode protocol may include a high mode and a low mode. The high mode refers to a logical device that handles high-speed data transfer related processing of a bus structure connection, and the low mode refers to a logical device that handles low-speed data transfer related processing of bus structure connection.

The bus protocol layer refers to a logical device that processes data, etc. transmitted through a transfer method using a bus structure and transfers necessary information, etc. to the upper layer.

The upper layer refers to a logical, physical device that actually processes commands.

FIG. 4 illustrates an HDMI system using CED according to an embodiment of the present invention.

HDMI CEC stands for HDMI Consumer Electronics Control. As discussed above, HDMI Consumer Electronics Control refers to a protocol that provides a capability that allows the user to control multiple multimedia devices with one operation in a network connected by HDMI cables, which will be hereinafter referred to as HDMI CEC.

As shown in FIG. 4, an HDMI CEC system may largely include an HDMI sink device 1020 and an HDMI source device 1010. The sink device 1020 may include an HDMI connector, an HDMI receiver, a central processing unit CPU, and a CEC converter, and the source device 1010 may include an HDMI connector, an HDMI receiver, a central processing unit CPU, and a CEC converter.

There are five HDMI connector types: types A, B, C, D, and E. For example, type A is a general HDMI connector with 19 pins, type B is a connector with 29 pins that transmits UHD video, type C is a mini connector with 19 pins, type D is a micro connector with 19 pins, and type E is an automotive connector.

As discussed above, the HDMI transmitter and the HDMI receiver may include three TMDS (Transition Minimized Differential Signaling) data transmission channels and one clock channel that deliver multimedia data via the HDMI connector, and control channels such as a DDC (Display Data Channel) (not shown), a CEC (Consumer Electronics Control) channel, a utility channel (not shown), and an HPD (Hot Plug Detect) channel (not shown).

The TMDS channel consists of three data transmission channels, and transmits video and audio data.

The CEC channel is a control channel that delivers a CEC protocol, a control command for controlling devices connected through HDMI by using a TV remote control. This capability lets the user control devices connected through HDMI with one remote control, without the need to control each device one by one, allowing for one touch play—that is, the function that allows connected players to play using a TV remote control, thereby increasing user convenience.

The central processing unit of the sink device 1020 may include a graphical user interface (GUI) layer, an application layer, and a CEC protocol layer, and the central processing unit of the source device 1010 may include an application layer and a CEO protocol layer.

The GUI layer processes data received through the HDMI receiver to be output through a GUI interface. The application layers process data in a user-defined manner, and the CEC protocol layers process the transmitted CEC data and transfer necessary information to an upper layer. The CEC protocol layer may perform physical address allocation and logical address allocation according to the present invention.

The CEC converters of the sink device 1020 and source device 1010 generate signals for data transmission or manage transmission priority and re-transmission for reliable transmission. For example, the CEC converters may perform frame transmission, line error handling, and frame validation. Further, the CEC converters function as an interface that function as an interface that performs HDMI CEC signal processing through per-frame data communication with the CPUs For example, the signal processors according to the present invention may process messages or data, such as commands, requests, actions, and responses between devices.

FIG. 5 illustrates an EDID structure according to an embodiment of the present invention.

EDID is a data structure containing various types of information about the display device defined in the VESA and can be transmitted to the source device through the DDC channel or read by the source device. In the case of EDID, the data structure of version 1.3 has been used in the IT display device, CE display device, and video interface (HDMI).

FIG. 5 shows an overview of the information represented by the respective addresses in the EDID data structure.

FIGS. 6 to 7 illustrate an embodiment of an EDID extension block.

FIG. 6 illustrates an EDID extension block, FIG. 7(a) a video data block, FIG. 7(b) an audio data block, and FIG. 7(c) a speaker allocation data block.

Timing information specified in the EDID is intended for IT display devices and can use the EDID 1.3 extension block defined in the CEA-861 to represent the timing information of CE display devices. The version 3 CEA extension block is defined in the CEA-861B standard and specifies four optional data blocks (video, audio, speaker allocation, and vendor-specific data block).

In the video data block of FIG. 7(a), the short video descriptor represents the video identification code defined in the CEA-861. In the audio data block of FIG. 7(b), the short audio descriptor represents the audio format code defined in the CEA-861. In the speaker allocation data block of FIG. 7(c), the speaker allocation data block descriptor represents the data block payload defined in the CEA-861.

FIG. 8 illustrates an HF (HDMI Forum)-VSDB (Vendor-Specific Data Block) according to an embodiment of the present invention.

The HF-VSDB shown in FIG. 8 is the data block that defines vendor-specific data, where HDMI can define HDMI-specific data by using the data block. The HF-VSDB can be included in the E-EDID of the sink device, and in that case, it can be positioned at CEA extension version 3 within the E-EDID of the sink device.

The fields included in the HF-VSDB of FIG. 8 are described as follows.

Length field: represents the total length of the data block, of which the minimum value is 7, and the maximum value is 31.

IEEE OUI field: refers to IEEE Organizationally Unique Identifier, and the OUI assigned to the HDMI forum is 0xC45DD8.

Version field: represents the version number of the HF-VSDB (HDMI Forum-VSDB), of which the value is 1.

Max_TMDS_Character_Rate field: represents the maximum TMDS character rate supported. If the sink device does not support the maximum TMDS character rate more than 340 Mcsc, it is set to 0; otherwise, it is set to 1.

3D_OSD_Disparity: when this field is set to 1, it indicates that the sink device supports reception of 3D_OSD_Disparity Indication.

Dual_view: when this field is set to 1, it indicates that the sink device supports reception of dual_view signaling.

Independent_view field: when this field is set to 1, it indicates that the sink device supports reception of 3D independent view signaling.

LTE_340Mcsc_scramble field: when this field is set to 1, it indicates that the sink device supports scrambling when the TMDS character rate is less than 340 Mcsc. And when the SCDC_Present is set to 0, this field also has to be set to 0.

RR_Capable field: when this field is set to 1, it indicates that the sink device can initiate an SCDC read request. And if the SCDC_Present is set to 0, this field also has to be set to 0.

SCDC_Present field: when this field is set to 1, it indicates that the sink device supports the SCDC function.

DC_48 bit_420, DC_36 bit_420, DC_30 bit_420: when these fields are set to 1, it indicates that deep color 4:2:0 pixel encoding is supported by 10 bit/12 bit/16 bit per component.

In the present invention, information on the sink device's capability of processing user-input data may be transmitted via EDID HF-VSDB, which will be described later.

FIG. 8 illustrates an SCDC (Status and Control Data Channel) structure according to an embodiment of the present invention.

The SCDC (Status and Control Data Channel) corresponds to a point-to-point communication protocol based on which the source device and the sink device exchange data with each other. The SCDC communication can use the aforementioned DDC channel (I2C line). In other words, the SCDC is a one-to-one communication protocol based on the I2C serial communication that enables HDMI source devices and sink devices to exchange data among them. The SCDC includes a mechanism in which the sink device, an I2C slave, requests status check read from the source device, an I2C master, and the source device receiving the request reads the corresponding status from the sink device.

The SCDCS (SCDC Structure) can be stored in the memory of the sink device and include data having the structure as shown in FIG. 8. In FIG. 8, R/W indicates whether the source device can only read or read/write the SCDCS data stored in the sink device.

The fields included in the SCDCS of FIG. 8 are described below.

Sink Version field: provides version information of an SCDCS compliant sink device.

Source Version field: when the SCDCS compliant sink device reads E-EDID from the sink device, and the SCDC_Present of the E-EDID is set to 1, the source version of the SCDCS is set to 1.

Update Flags (Update_0, Update_1) field: when there is a change in the information that the sink device has to inform of the source device (Status, Character Error Detect, and so on), the corresponding bit is set to 1.

TMDS Configuration (TMDS_Config) field: each of the TMDS_Bit_Clock_Ratio and Scrambling_Enable occupies one bit, and if the source device attempts to activate the scrambling function of the sink device, the corresponding bit is set to 1. If the TMDS_Bit_Clock_Ratio is ⅒, this field is set to 0 while it is set to 1 in the case of ¹⁄₄₀.

Scrambler Status field: when the sink device detects a scrambled control code sequence, the corresponding bit is set to 1.

Configuration (Config_0) field: this field is used to configure capability-related information of the source and the sink device. Currently, this field provides only the RR_Enable field that indicates whether the source device supports a read request of the sink device.

Status Flags (Status_Flag_0, Status_Flag_1) field: indicates whether data received through the clock, channel 0, 1, and 2 have been decoded successfully.

Err_Det_0~2_UH field: represent the LSB and MSB of the error counter detected in the channel 0 to 3.

Err_Det_Checksum field: is implemented so that one byte sum of error detection values of seven registers including checksum becomes 0.

FIGS. 10 and 11 illustrate a structure of a CEC message according to an embodiment of the present invention.

As discussed above, CEC allows for operation of CEC-enabled devices connected through HDMI by using only one remote control. Once HDMI is connected, each device has a physical address, and devices that support CEC have a logical address.

Each device may send and receive messages via a CEO line when an event occurs, and the messages may have the following functions:

One Touch Play: allows a device to be played and become the active source with a single button click.

Routing Control: controls the routing of the HDMI network while the CEC switch is in use.

System Standby: switches all connected devices to standby mode.

One Touch Record: controls the recording of whatever is being shown on the TV.

Preset Transfer: transfers the tuner channel setup to another TV set.

Timer Programming: allows a device to set a timer on another device.

System Information: allows devices to use the same OSD and Menu language settings as the TV Deck Control: allows a playback device to be controlled by another device.

Tuner Control: allows a device to control another device's tuner.

OSD display: allows a device to transfer text to the TV for on-screen display.

Device OSD Name Transfer: transfers the preferred device names to the TV set.

Device Menu Control: allows device menus to be controlled via the TV remote control.

Remote Control Pass Through: allows remote control inputs to be passed through to other devices.

Vendor Specific Commands: vender-defined commands

A CEC message is transmitted in a CEC frame, and as shown in (a) of FIG. 10, the CEC frame may consist of a start bit, a header block, a first data block, and a second data block.

Each block has a length of 10 bits, and the message has a maximum length of 16*10 bits, excluding the start bit.

As shown in (c) of FIG. 10 and (a) of FIG. 11, the header block includes the address of a source device (or initiator) and the address of a destination. The first data block includes an opcode block, and the second data block includes an operand block. Here, the term "opcode" means a denotation used to identify a message.

Each of the data block and the header block may include an information bits field, an EOM (End Of Message) field, and an ACK field.

The information bits field may include data, an opcode or an address. The EOM field includes a bit to indicate whether a block is the last block of a message. For example, the EOM field being 0 may indicate that there are one or more data blocks, and the EOM field being 1 may indicate that the message has been done. Even when a message includes additional data after the EOM field has been transmitted, the device receiving the message should discard the same.

The initiator sets the ACK field to 1 to send it, and the follower marks it as '0' to indicate the receipt of the message.

FIG. 12 illustrates a method of transmitting and receiving data over HEAC (HDMI Ethernet Audio Channel) of HDMI according to an embodiment of the present invention.

HEAC stands for HDMI Ethernet Audio Channel, which is hereinafter referred to as "HEAC". In HEAC, Ethernet is standardized as IEEE 802.3, and audio data is standardized as IEC60958-1.

Pin 14 is used as Utility/HEC/ARC (Optional, HDMI 1.4+ with HDMI Ethernet Channel and Audio Return Channel), Pin 17 is used as DDC/CEC/HEC Ground, and Pin 19 is used as HEC/ARC (Optional, HDMI 1.4+ with HDMI Ethernet Channel and Audio Return Channel).

As shown in FIG. 12, HEC provides an HDMI Ethernet network connection, uses 100BAST-TX type, supports Full duplex mode, and has a data rate of 100 Mbps.

The HEC network consists of a sink device, a repeater, and a source device that are connected to one another by HEAC cables. The repeater or source device including at least two HEC connectors has an internal Layer 2 switch (LS2 W) to forward a MAC frame.

ARC stands for Audio Return Channel. ARC allows digital audio signal transmitted from the sink device, e.g., a TV, through the repeater to be sent upstream to the repeater, e.g., an AV amp, via HDMI. In this case, the TV that transmits audio signals becomes the source device, and it is possible to find out what audio formats the amp supports by using CEC.

FIG. 13 illustrates a state transition of an HEC channel and a CDC (Capability Discovery and Control) message according to an embodiment of the present invention.

The HEC channel is controlled through CEC messages. In this case, a CEC command for controlling the HEC state is referred to as HEC CDC (Capability Discovery and Control).

The HEC may have the following states:
Potential HEC: initial connection state (PHEC).
Verified HEC: the HEC functionality support is verified (VHEC).
Active HEC: the HEC functionality is activated (AHEC).

The HEC CDC is transmitted via CEC, and allows for the discovery of the HEC in the potential HEC state.

Also, the HEC may be activated or deactivated, and the channel state may be transferred.

As shown in (a) of FIG. 13, when HDMI is initially connected to a device, the HEC of the device exists in the Potential HEC (PHEC) state. The device connected to HDMI may transmit a <CDC_HEC_Discover> message in order to discover the HEC capability of other devices connected by HDMI (S13010).

If another device that has received the <CDC_HEC_Discover> message has support for the HEC functionality, the another device may transmit a <CDC_HEC_ReportState> message in response to the <CDC_HEC_Discover> message.

However, if the another device that has received the <CDC_HEC_Discover> message has no support for the HEC functionality, the another device does not respond to the <CDC_HEC_Discover> message.

By this method, the device may find out if other devices connected by HDMI have support for the HEC functionality.

If the <CDC_HEC_ReportState> message indicates "inactive", the device may transmit a <CEC_HEC_SetState> message to the another device in order to activate the HEC.

Upon receiving the <CEC_HEC_SetState> message, the another device may activate all HECs present between the device and the another device, and then transmit a <CEC_HEC_ReportState> message to the device to report the active state of the HEC (S13020).

Afterwards, the device may transmit a <CDC_HECSetState> message in order to deactivate the HEC in the active state (S13050).

Upon receiving the <CDC_HECSetState> message, the another device may deactivate all HECs between the device and the another device.

If part of the devices existing in the VHEC state has no support for the HEC functionality, the devices that have no support for the HEC functionality may return to the PHEC state (S13040).

(b) of FIG. 13 illustrates a frame structure of the CDC message. The CDC message may include a start bit field, a CEC header block field, a CEC Opcode block field, a CEC Initiator Phy. Address field, a CDC Opcode field, and/or a CDC parameter field.

The start bit field, CEC header block field, CEC Opcode block field, and CEC Initiator Phy. Address field are as explained above in FIGS. 9 and 10, so explanations of them will be omitted.

The CDC Opcode field indicates what type of message the CDC message is, and the CDC parameter field may include parameters of each CDC message.

The present invention proposes a method for transmitting and receiving data obtained from an image pick-up device over the above-explained HEC.

FIG. 14 illustrates a MAC frame format according to an embodiment of the present invention.

FIG. 14 illustrates a structure of a MAC frame that is forwarded over the above-explained HEC. Data can be transmitted using the MAC data frame (IEEE 802.3).

The present invention proposes a method for transmitting and receiving user-input data between a sink device and a source device over HEC by using the data field of the MAC frame.

FIG. 15 illustrates a method for transmitting and receiving A/V data according to an embodiment of the present invention.

Referring to FIG. 15, a sink device and a source device may transmit and receive A/V data via HDMI.

Specifically, the source device 1010 and the sink device 1020 are connected by a HDMI cable (S15010). Once the HDMI cable is connected, the source device 1010 transitions a 5V power line from low level to high level and applies an electric current (S15020). By this, the source device 1010 may drive the EEPROM storing the sink device 2020's EDID information and related circuits.

The sink device 1020 may transition an HPD (Hot Plug Detect) line from low level to high level (S15030) to inform the source device 1010 that the cable is properly connected and the EDID-related circuits are activated to enable access to the EDID information.

Now, the source device 1010 may transmit an EDID information read request to the sink device 1020 over a DDC (S15040). In response to the EDID read request from the source device 1010, the sink device 1020 may transmit the EDID information stored in the EEPROM over the DDC (S15050). In the embodiment of the present invention, the EDID information may be transmitted in the above-described VSDB.

The source device 1010 may parse the received EDID information to determine operating parameters of the A/V data to be transmitted to the sink device 1020 (timing, format, etc.) (S15060), and transmit to the source device the determined operating parameters associated with the uncompressed A/V data to be transmitted.

The method explained with reference to FIG. 15 is a method for transmitting and receiving the A/V data stored in the source device. However, the above method does not allow the sink device to find out whether the source device is capable of processing user-input data. Thus, the sink device cannot transmit data input from the user to the source device.

Therefore, the present invention proposes a method in which the sink device receives from the source device information about whether the source device is capable of processing user-input data and, if the source device is capable of processing user-input data, transmits the user-input data to the source device.

FIG. 16 illustrates a method for transmitting user-input data from a sink device to a source device according to an embodiment of the present invention.

First of all, the steps S16010 through S16060 are performed in the same way as the steps S15010 through S15060 of FIG. 15, so redundant descriptions will be omitted. FIG. 16 involves operations to be added to the flowchart of FIG. 15. so redundant descriptions will be omitted. Descriptions of these steps of FIG. 15 also may apply to FIG. 16 even if they are omitted in FIG. 15.

In FIG. 16, the sink device 1020 sends the source device 1020 a request for data processing capability information indicating whether the source device 1010 is capable of processing user-input data, in order to find out whether the source device 1010 is capable of processing user-input data (S16070). The user-input data will be explained below.

Upon receiving the request for data processing capability information, the source device 100 may transmit to the sink device 1020 information about whether it is capable of processing user-input data and, if so, information about data types it can process.

The data types may include a mouse type indicating data input from a mouse, a touch type indicating data input with a touch on a touchscreen or touchpad, a multi-touch type, or a touch-pen type indicating data input from a touch-pen, depending on the method of user input.

The sink device 1020 may display the received data processing capability information on the screen (S16090). This step is optional and may not be performed.

Afterwards, upon receiving data input from the user, the sink device 1020 may transmit the input data to the source device 1010 (S16100). With this method, the user data input into the sink device 1020 may be transferred to the source device 1010. The transferred data may be processed by the source device 1010.

FIG. 17 illustrates a method for transmitting user-input data from a sink device according to an embodiment of the present invention.

FIG. 17 depicts the procedure of FIG. 16 from the point of view of the sink device 1020. The sink device 1020 may send the source device 1020 a request for data processing capability information, in order to find out whether the source device 1010 is capable of processing user-input data (S17010).

The data processing capability information indicates whether the source device 1010 is capable of processing various data input from the user. If the source device 1010 is capable of processing user-input data, the data processing capability information may include data types the source device 1010 can process, or data types that can be processed, and be transmitted to the sink device (S17020).

The sink device 1010 may display the data processing capability information of the source device on the screen (S17030). The step S17030 is optional and may not be performed.

Afterwards, upon receiving data input from the user, the sink device 1020 may transmit the input data to the source device 1010 if the source device 1020 is capable of processing the input data (S17040).

FIG. 18 illustrates types of user-input data according to an embodiment of the present invention.

FIG. 18 depicts data types the sink device 1020 or the source device 1010 can process. The data types may include a mouse type indicating input from a mouse, a touch type indicating input via a touchscreen or touchpad, a multi-touch type, or a touch-pen type indicating input from a touch-pen.

The multi-touch refers to enabling the touchscreen or touchpad to recognize multiple, simultaneous touch points.

Referring to FIG. 18, different data is contained for each data type, and the sink device 1020 or the source device 1010 may include information on data types they can support or process in the data processing capability information and transmit it, or transmit this information along with the data processing capability information.

FIG. 19 illustrates a method for transmitting user-input data via HDMI CEC (Consumer Electronics Control) according to an embodiment of the present invention.

Referring to FIG. 19, the sink device may transmit and receive data processing capability information and user-input data via CEC.

First of all, it is assumed that the source device 1010 and sink device 1020 of FIG. 19 have performed the steps S15010 to S15060 of FIG. 15.

Afterwards, the sink device 1020 may send the sink device 1020 a request for data processing capability information indicating whether the source device is capable of processing user-input data, through a CEC message such as <Request User Input capability> (S19010).

In response to the request, the source device 1010 may transmit to the sink device 1020 data processing capability information indicating whether it is capable of processing user-input data, through a CEC message such as <Report User Input capability>[capability] (S19020).

If the source device 1010 is capable of processing the user-input data, the source device 1010 may include data types it can process in a CEC message such as <Report User Input capability>[capability] and transmit it to the sink device 1020.

The sink device 1020 may display the data processing capability information on the screen (S19030). However, the step S19030 is optional and may not be performed.

Afterwards, the sink device 1020 may transmit the user-input data to the source device 1010 through a CEC message such as <User Input Data>[value] (S19040).

FIG. 20 illustrates a method for transmitting user-input data over HEC (HDMI Ethernet Channel) according to an embodiment of the present invention.

Referring to FIG. 20, the sink device may transmit and receive data processing capability information and user-input data over HEC or CEC.

First of all, it is assumed that the source device 1010 and sink device 1020 of FIG. 19 have performed the steps S15010 to S15060 of FIG. 15.

In order to transmit data over an HEC, the sink device 1020 may transmit through CEC message to the source device 1010 a CEC message such as <CDC_HEC_InquireState> inquiring about the state of the HEC described with reference to FIG. 13 (S20010).

In this case, in order for the source device 1010 and the sink device 1020 to use CEC, all devices in the HDMI CEC system should have their own unique physical address to activate the HDMI CEC functionality.

If an HDMI host device is a sink device, the sink device 1020 should perform a physical address allocation mechanism regardless of whether it has support for the CEC functionality or not. Other devices might not be allocated physical addresses unless they have support for the CEC functionality. A physical address may include 4 digits.

The sink device 1020 generates a physical address 0.0.0.0, and reads the address from EDID in the sink device 1020.

The sink device 1020 should generate a physical address of the source device 1010 connected to it. A portion of the EDID VSDB (Vendor Specific Data Block) of the source device is used for the physical address.

As a method for generating a physical address of the source device 1010, a subsequent digit may be incremented by 1 each time the source device 1010 shifts down to a lower layer. In the present invention, it is assumed that the physical address of the source device is 1.0.0.0.

The sink device 1020 may receive a CEC message such as <CDC_HEC_ReportState> containing information about the HEC message via the CEC, as a response to the CEC message inquiring about the state of the HEC (S20020).

The <CEC_HEC_ReportState> message may include the operands shown in Table 1 below.

TABLE 1

| Name | Range Description | | Length | Purpose |
|---|---|---|---|---|
| [HEC State] | [HEC Functionality State]<br>[Host Functionality State]<br>[ENC Functionality State]<br>[CEC Error Code] | | 1 byte | |
| [HEC Functionality State] | "HEC Not Supported" | 0 | 2 byte | Indicates that HEC Functionality is not supported |
| | "HEC Inactive" | 1 | | Indicates that HEC Functionality is supported but inactive |
| | "HEC Active" | 2 | | Indicates that HEC Functionality is supported and active |
| | "HEC Activation Field" | 3 | | Indicates that HEC Functionality is supported and active on at least one HDMI port. The activation state of each HDMI port is indicated in the [HEC Activation Field] parameter. This value shall only be used in response to a <CDC_HEC_SetState> message containing multiple VHECs |
| [Host Functionality State] | "Host Not Supported" | 0 | 2 bits | Indicates that Host Functionality is not supported |
| | "Host Inactive" | 1 | | Indicates that Host Functionality is supported but inactive |
| | "Host Active" | 2 | | Indicates that Host Functionality is supported and active |
| [ENC Functionality State] | "Ext Con Not Supported" | 0 | 2 bits | Indicates that an External Network Connection is not supported(e.g. no cable connected) |
| | "Ext Con inactive" | 1 | | Indicates that an External Network Connection is supported but inactive |
| | "Ext Con Active" | 2 | | Indicates that an External Network Connection is supported and active |
| [HEC Set State] | "Deactivate HEC" | 0 | 1 byte | Sets the required HEC Functionality state of the HDMI Ethernet Channel |
| | "Activate HEC" | 1 | | |
| [Input port number] | Initiator's (Sink's) input Port number | 0 ≤ N ≤ 15 | 4 bits | The value of the nibble of the Initiator's physical address that is different in the directly Follower's physical address. |
| [CDC_HPD_Error_Code] | "No Error" | 0x0 | 4 bits | Same Range as [CDC Error Code] |
| | "Initiator does not have the requested Capability" | 0x1 | | The device never support this Capability |
| | "Initiator is not capable to carry out the request in this state" | 0x2 | | The Device supports this Capability, but is not capable to carry out the request in the current state<br>Note: A Source shall not use this parameter |
| | "Other Error" | 0x3 | | Another error occurred |
| | "No Error, No Video Steam" | 0x4 | | "No Error" response with additional indication that the Source is not sending a video stream |
| | Reserved | 0x5-0xf | | |

If the HEC is inactive, the sink device 1020 may transmit a CEC message such as <CDC_HEC_SetState> to the source device 1010 over CEC (S20030) so as to activate all HECs present between the sink device 1020 and the source device 1010.

After the HEC is activate through the CEC message, the source device 1010 may transmit to the sink device a CEO message such as <CDC_HEC_ReportState> containing the HEC's state information, in order to inform the sink device 1020 that the HEC is activated (S20040).

However, if the HEC is already activated, then the steps S20030 and S20040 may not be performed.

Afterwards, the sink device 1020 may transmit a message such as <Request User Input capability> to the source device 1010 over the activated HEC or CEC channel so as to request data processing capability information of the source device (S20050).

In response to the request, the source device 1010 may transmit to the sink device 1020 a message such as <Report User Input capability>[capability] containing data processing capability information indicating whether it is capable of processing user-input data, over the HEC or CEC channel (S20060).

If the source device 1010 is capable of processing the user-input data, the source device 1010 may include data types it can process in a CEC message such as <Report User Input capability>[capability] and transmit it to the sink device 1020 over the HEC or CEC channel.

The sink device 1020 may display the data processing capability information on the screen (S20070). However, the step S20070 is optional and may not be performed.

Afterwards, if there is data input from the user, the sink device 1020 may include the user data in a message such as <User Input Data>[value] and transmit the input data to the source device 1010 over the HEC or CEC (S20080).

FIG. 21 illustrates a method for transmitting user-input data over HEC (HDMI Ethernet Channel) according to another embodiment of the present invention.

Referring to FIG. 21, the sink device may transmit and receive data processing capability information and user-input data over HEC or CEC.

First of all, it is assumed that the source device 1010 and sink device 1020 of FIG. 21 have performed the steps S15010 to S15060 of FIG. 15.

Afterwards, the sink device 1020 may transmit a message such as <Request User Input capability> to the source device 1010 over the HEC or CEC channel so as to request data processing capability information of the source device (S21010).

In response to the request, the source device 1010 may transmit to the sink device 1020 a message such as <Report User Input capability>[capability] containing data processing capability information indicating whether it is capable of processing user-input data, over the HEC or CEC channel (S21020).

If the source device 1010 is capable of processing the user-input data, the source device 1010 may include data types it can process in a CEC message such as <Report User Input capability>[capability] and transmit it to the sink device 1020 over the HEC or CEC channel.

The sink device 1020 may display the data processing capability information on the screen (S21030). However, the step S21030 is optional and may not be performed.

Afterwards, the steps S21040 through S21070 are performed in the same way as the steps S20010 through S20040 of FIG. 20, so redundant descriptions will be omitted.

Descriptions of these steps of FIG. 15 also may apply to FIG. 16 even if they are omitted in FIG. 16.

Afterwards, if there is data input from the user, the sink device 1020 may include the user data in a message such as <User Input Data>[value] and transmit the input data to the source device 1010 over the HEC or CEC (S21080).

FIGS. 22 and 23 illustrate a method for transmitting user-input data from a sink device over HEC (HDMI Ethernet Channel) according to another embodiment of the present invention.

FIGS. 22 and 23 depict a method for transmitting user-input data from a sink device to a source device depending on whether the source device has support for HEC (HDMI Ethernet Channel).

First of all, it is assumed that the source device 1010 and sink device 1020 of FIGS. 22 and 23 have performed the steps S15010 to S15060 of FIG. 15.

Afterwards, the sink device 1020 may determine if the source device 1010 has support for HEC (HDMI Ethernet Channel).

If the source device 1010 has no support for HEC, the sink device 1020 may send a request for data processing capability information of the source device through a CEC message such as <Request User Input capability> (S22010).

In response to the request, the source device 1010 may transmit to the sink device 1020 a message such as <Report User Input capability>[capability] containing data processing capability information indicating whether it is capable of processing user-input data (S22020).

If the source device 1010 is capable of processing the user-input data, the source device 1010 may include data types it can process in a CEC message such as <Report User Input capability>[capability] and transmit it to the sink device 1020.

The sink device 1020 may display the data processing capability information on the screen (S22030). However, the step S22030 is optional and may not be performed.

Afterwards, if there is data input from the user, the sink device 1020 may transmit the user-input data to the source device 100 through a message such as <User Input Data>[value] (S22040).

On the other hand, if the source device 1010 has support for HEC, the procedure of FIG. 23 is performed.

The steps S23010 through S23080 are identical to the steps S20010 through S20080 of FIG. 20, so descriptions thereof will be omitted below.

FIGS. 24 and 25 illustrate a method for transmitting user-input data from a sink device over HEC (HDMI Ethernet Channel) according to another embodiment of the present invention.

Referring to FIGS. 24 and 25, the sink device may find out whether the source device is capable of processing user-input data, and then transmit the user-input data to the source device over a HEC or CEC channel depending on whether the sink device has support for HEC (HDMI Ethernet Channel).

First of all, it is assumed that the source device 1010 and sink device 1020 of FIGS. 24 and 25 have performed the steps S15010 to S15060 of FIG. 15.

Afterwards, the sink device 1020 may transmit a message such as <Request User Input capability> to the source device 1010 over the HEC or CEC channel so as to request data processing capability information of the source device (S24010).

In response to the request, the source device 1010 may transmit to the sink device 1020 a message such as <Report User Input capability>[capability] containing data processing capability information indicating whether it is capable of processing user-input data, over the HEC or CEC channel (S24020).

If the source device 1010 is capable of processing the user-input data, the source device 1010 may include data types it can process in a CEC message such as <Report User Input capability>[capability] and transmit it to the sink device 1020 over the HEC or CEC channel.

Afterwards, the sink device 1020 may determine if the source device 1010 has support for HEC (HDMI Ethernet Channel).

If the source device 1010 has no support for HEC, the sink device 1020 may display the data processing capability information on the screen (S24030). However, the step S24030 is optional and may not be performed.

Afterwards, if there is data input from the user, the sink device 1020 may transmit the user-input data to the source device 100 through a message such as <User Input Data> [value] (S24040).

On the other hand, if the source device 1010 has support for HEC, the procedure of FIG. 25 is performed.

The steps S25010 through S25060 are identical to the steps S21030 through S21080 of FIG. 21, so descriptions thereof will be omitted below.

FIGS. 26 to 28 illustrate data structures for different data types of user input data according to an embodiment of the present invention.

Referring to FIG. 26, data structures for different data types of user input data that are used in FIGS. 16 through 25 are depicted.

Specifically, in the case of data input from the user through a mouse, the user-input data may include a state field, an X-coordinate field, and/or Y-coordinate field, as shown in (a) of FIG. 26.

Descriptions of these fields are illustrated in (b) of FIG. 26.

Referring to FIG. 27, in the case of data input from the user by multi-touch, the user-input data may include an ID field, a state field, an X-coordinate field, an Y-coordinate field, and an option field, as shown in (a) of FIG. 27.

Descriptions of these fields are illustrated in (b) of FIG. 27.

Referring to FIG. 28, in the case of data input from the user through a multi-pen, the user-input data may include an ID field, a state field, an X-coordinate field, an Y-coordinate field, and an option field, as shown in (a) of FIG. 28.

Descriptions of these fields are illustrated in (b) of FIG. 28.

It will be apparent to those having ordinary skill in the technical field to which the present invention pertains that the above-described present invention is not limited to the above-described embodiments and the attached drawings, but that various substitutions, modifications and variations are possible within a range that does not depart from the technical spirit of the present invention.

The invention claimed is:

1. A method for a source device to transmit and receive data using High-Definition Multimedia Interface (HDMI), the method comprising:
   receiving, from a sink device, a request for transmitting data processing capability information,
   wherein the data processing capability information indicates whether the source device supports a type of user input data detected by the sink device;
   transmitting, to the sink device, the data processing capability information; and
   when the type of the user input data is supported by the source device, receiving the user input data from the sink device,
   wherein, if an HDMI Ethernet Channel (HEC) between the source device and the sink device is active, the user input data is received over the HEC, and
   wherein, if the HEC is inactive, the user input data is received over an HDMI Consumer Electronics Control (CEC) channel.

2. The method of claim 1, wherein the data processing capability information further includes data type information indicating the type of the user input data.

3. The method of claim 2, wherein the data type information includes at least one of mouse type information, multi-touch type information, touch type information, or touch-pen type information which indicates a method of inputting the user input data.

4. The method of claim 3, wherein, when the user input data is received over the HEC, the method further comprises:
   receiving, from the sink device, an inquiry message requesting state information indicating whether the HEC is available or not; and
   transmitting, to the sink device, a first reporting message containing the state information,
   wherein the state information indicates either an active state or an inactive state of the HEC.

5. The method of claim 4, wherein, when the state information indicates the inactive state of the HEC, the method further comprises:
   receiving, from the sink device, a set message for activating the HEC; and
   transmitting, to the sink device, a second reporting message containing state information indicating the active state of the HEC, after activating the HEC.

6. A method for a sink device to transmit and receive data using High-Definition Multimedia Interface (HDMI), the method comprising:
   transmitting, to a source device, a request for transmitting data processing capability information,
   wherein the data processing capability information indicates whether the source device supports a type of user input data detected by the sink device;
   receiving, from the source device, the data processing capability information; and
   when the type of the user input data is supported by the source device, transmitting the user input data to the source device,
   wherein, if an HDMI Ethernet Channel (HEC) between the source device and the sink device is active, the user input data is transmitted over the HEC, and
   wherein, if the HEC is inactive, the user input data is transmitted over an HDMI Consumer Electronics Control (CEC) channel.

7. The method of claim 6, wherein the data processing capability information further includes data type information indicating the type of the user input data.

8. The method of claim 7, wherein, the data type information includes at least one of mouse type information, multi-touch type information, touch type information, or touch-pen information which indicates a method of inputting the user input data.

9. The method of claim 8, wherein, when the user input data is transmitted over the HEC, the method further comprises:

transmitting, to the source device, an inquiry message requesting state information indicating whether the HEC is available or not; and
receiving, from the source device, a first reporting message including the state information,
wherein the state information indicates either an active state or an inactive state of the HEC.

10. The method of claim 9, wherein, when the state information indicates the inactive state of the HEC, the method further comprises:
transmitting, to the source device, a set message for activating the HEC; and
receiving, from the source device, a second reporting message containing state information indicating the active state of the HEC, after activating the HEC.

11. A source device for transmitting and receiving data using High-Definition Multimedia Interface (HDMI), the source device comprising:
an HDMI transmitter configured to transmit and receive data via HDMI; and
a processor configured to:
control the HDMI transmitter to receive, from a sink device, a request for transmitting data processing capability information,
wherein the data processing capability information indicates whether the source device supports a type of user input data detected by the sink device,
control the HDMI transmitter to transmit, to the sink device, the data processing capability information, and
when the type of the user input data is supported by the source device, control the HDMI transmitter to receive the user input data from the sink device,
wherein, if an HDMI Ethernet Channel (HEC) between the source device and the sink device is active, the user input data is received over the HEC, and
wherein, if the HEC is inactive, the user input data is received over an HDMI Consumer Electronics Control (CEC) channel.

12. The source device of claim 11, wherein the data processing capability information further includes data type information indicating the type of the user input data.

13. The source device of claim 12, wherein, when the user input data is received over the HEC, the source device receives from the sink device an inquiry message requesting state information indicating whether the HEC is available or not, and transmits to the sink device a first reporting message containing the state information, and
wherein the state information indicates either an active state or an inactive state of the HEC.

14. A sink device for transmitting and receiving data using High-Definition Media Interface (HDMI), the sink device comprising:
an HDMI transmitter configured to transmit and receive data via HDMI; and
a processor configured to:
control the HDMI transmitter to transmit, to a source device, a request for transmitting data processing capability information,
wherein the data processing capability information indicates whether the source device supports a type of user input data detected by the sink device,
control the HDMI transmitter to receive, from the source device, the data processing capability information, and
when the type of the user input data is supported by the source device, control the HDMI transmitter to transmit the user input data to the source device,
wherein, if an HDMI Ethernet Channel (HEC) between the source device and the sink device is active, the user input data is transmitted over the HEC, and
wherein, if the HEC is inactive, the user input data is received over an HDMI Consumer Electronics Control (CEC) channel.

15. The sink device of claim 14, wherein the data processing capability information further includes data type information indicating the type of the user input data.

16. The sink device of claim 15, wherein, when the user input data is transmitted over the HEC, the sink device transmits to the source device an inquiry message requesting state information indicating whether the HEC is available or not, and receives from the source device a first reporting message containing the state information, and
wherein the state information indicates either an active state or an inactive state of the HEC.

* * * * *